(12) United States Patent
Maeda et al.

(10) Patent No.: US 8,462,652 B2
(45) Date of Patent: Jun. 11, 2013

(54) TRANSMISSION DEVICE AND SWITCHOVER PROCESSING METHOD

(75) Inventors: Yoshiyuki Maeda, Fukuoka (JP); Yumiko Ogata, Fukuoka (JP); Taku Yoshida, Fukuoka (JP); Seiji Miyata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 12/662,369

(22) Filed: Apr. 13, 2010

(65) Prior Publication Data

US 2010/0205398 A1 Aug. 12, 2010

Related U.S. Application Data

(63) Continuation of application No. PCT/JP2007/072032, filed on Nov. 13, 2007.

(51) Int. Cl.
*H04L 12/26* (2006.01)

(52) U.S. Cl.
USPC .......................................... 370/252; 370/220

(58) Field of Classification Search
USPC ................. 370/216–229, 241, 242, 244, 250, 370/252; 700/1–3, 21, 27; 709/208–209
See application file for complete search history.

(56) References Cited

U.S. PATENT DOCUMENTS

| | | | |
|---|---|---|---|
| 6,718,084 B1 * | 4/2004 | Wang | 385/17 |
| 7,290,259 B2 | 10/2007 | Tanaka et al. | |
| 7,436,291 B2 * | 10/2008 | Sellars et al. | 340/500 |
| 2003/0031126 A1 | 2/2003 | Mayweather et al. | |
| 2005/0195864 A1 | 9/2005 | Matsuo et al. | |

FOREIGN PATENT DOCUMENTS

| | | |
|---|---|---|
| JP | 6-30002 | 4/1994 |
| JP | 8-202672 | 8/1996 |
| JP | 11-259258 | 9/1999 |
| JP | 2002-202959 | 7/2002 |
| JP | 2004-533142 | 10/2004 |
| JP | 2006-94311 | 4/2006 |
| WO | 02/073903 A1 | 9/2002 |
| WO | 2004/088929 A1 | 10/2004 |

OTHER PUBLICATIONS

International Search Report for PCT/JP2007/072032, mailed on Dec. 11, 2007.

* cited by examiner

*Primary Examiner* — Michael Thier
*Assistant Examiner* — Feben M Haile
(74) *Attorney, Agent, or Firm* — Staas & Halsey LLP

(57) ABSTRACT

In an optical transmission device, firmware that operates within a CPU of a first LIU and firmware that operates within a CPU of a second LIU periodically measure a load status of a CPU via an OS, respectively. Switchover control of a master CPU is performed according to a load status of a CPU measured by the firmware of each LIU. For example, when a load status of the CPU of the second LIU is lower than that of the CPU of the first LIU, a master CPU that performs switchover control of a predetermined port is switched to a slave CPU in the first LIU, and a slave CPU related to the predetermined port is switched to a master CPU in the second LIU, thereby dynamically changing the setting.

15 Claims, 24 Drawing Sheets

FIG.1A
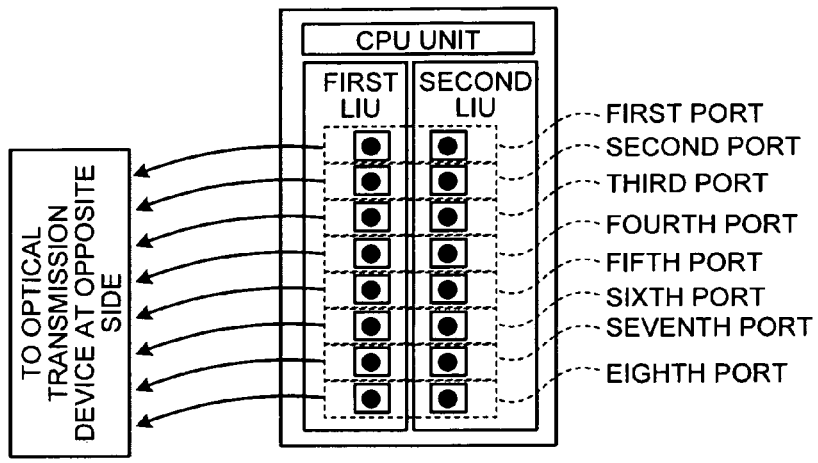
FIG.1B
|  | FIRST LIU | SECOND LIU |
|---|---|---|
| FIRST PORT | MASTER CPU | SLAVE CPU |
| SECOND PORT | MASTER CPU | SLAVE CPU |
| THIRD PORT | MASTER CPU | SLAVE CPU |
| FOURTH PORT | MASTER CPU | SLAVE CPU |
| FIFTH PORT | SLAVE CPU | MASTER CPU |
| SIXTH PORT | SLAVE CPU | MASTER CPU |
| SEVENTH PORT | SLAVE CPU | MASTER CPU |
| EIGHTH PORT | SLAVE CPU | MASTER CPU |
FIG.1C
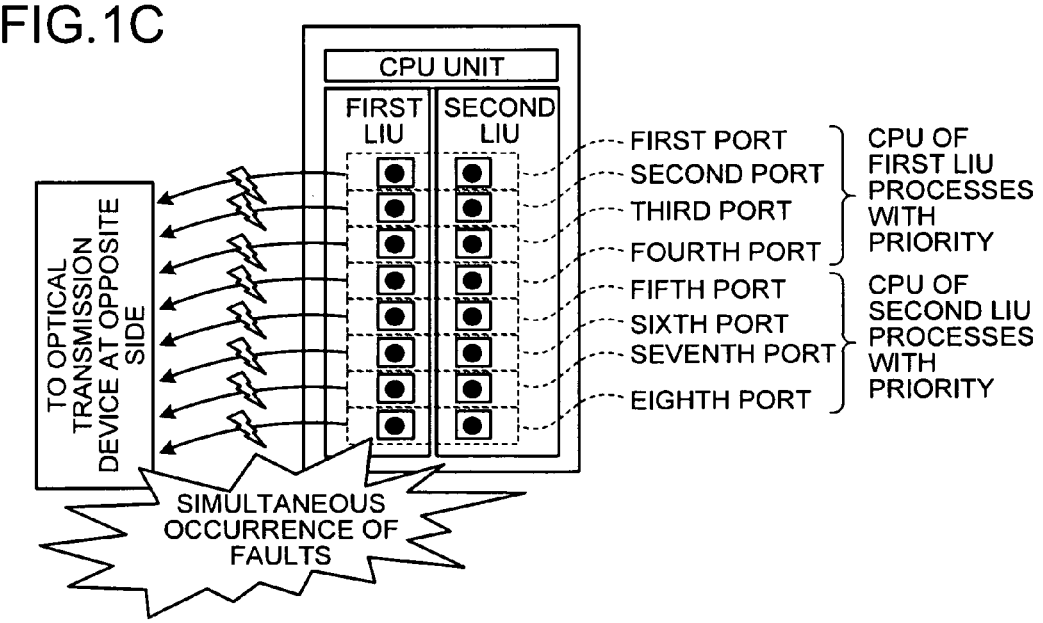

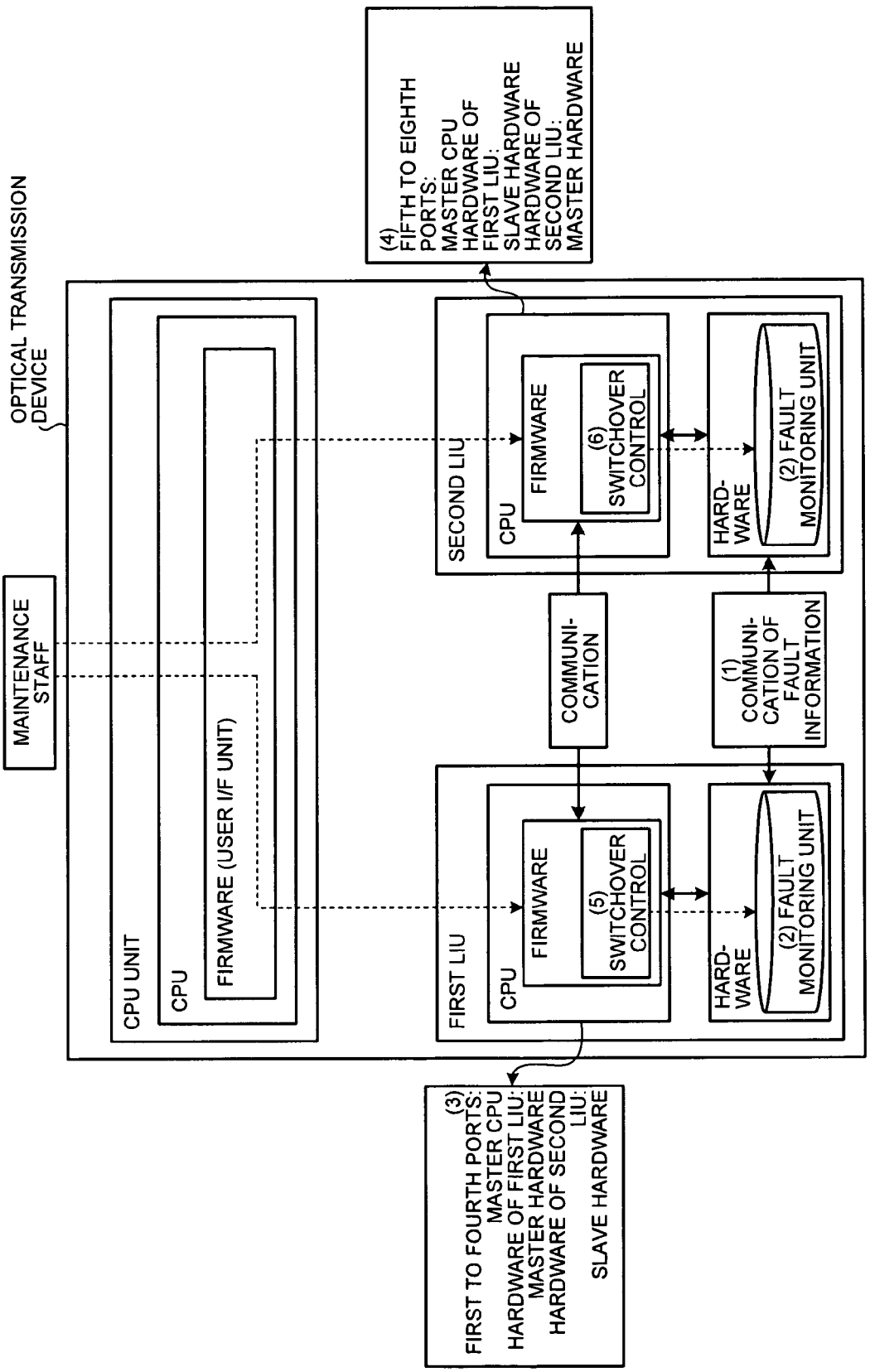

FIG.5A

| FIRST LIU | | | | | | | | |
|---|---|---|---|---|---|---|---|---|
| PORT NUMBER | 1 | 2 | 3 | 4 | 5 | 6 | 7 | 8 |
| STATUS | M | M | M | M | S | S | S | S |

FIG.5B

| SECOND LIU | | | | | | | | |
|---|---|---|---|---|---|---|---|---|
| PORT NUMBER | 1 | 2 | 3 | 4 | 5 | 6 | 7 | 8 |
| STATUS | S | S | S | S | M | M | M | M |

FIG.6

| CPU LOAD FACTOR (%) | CPU LOAD RANK | CPU LOAD COLLECTION_Flag |
|---|---|---|
| 0 TO 10 | 1 | |
| 10 TO 20 | 2 | |
| 20 TO 30 | 3 | |
| 30 TO 40 | 4 | |
| 40 TO 50 | 5 | ACT OR NOT ACT |
| 50 TO 60 | 6 | |
| 60 TO 70 | 7 | |
| 70 TO 80 | 8 | |
| 80 TO 90 | 9 | |
| 90 TO 100 | 10 | |

FIG.7A

| FIRST LIU | | | | | | | | |
|---|---|---|---|---|---|---|---|---|
| PORT NUMBER | 1 | 2 | 3 | 4 | 5 | 6 | 7 | 8 |
| STATUS | M | M | M | S | S | S | S | S |

FIG.7B

| SECOND LIU | | | | | | | | |
|---|---|---|---|---|---|---|---|---|
| PORT NUMBER | 1 | 2 | 3 | 4 | 5 | 6 | 7 | 8 |
| STATUS | S | S | S | M | M | M | M | M |

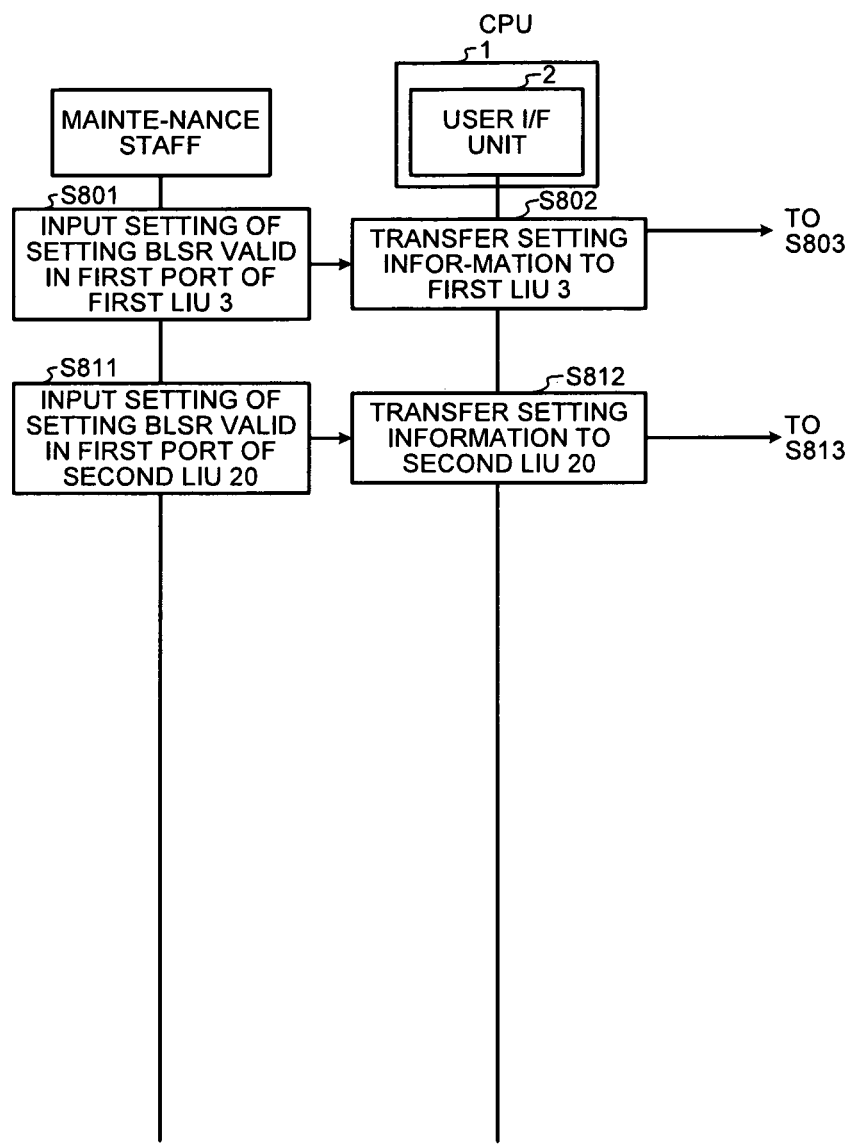

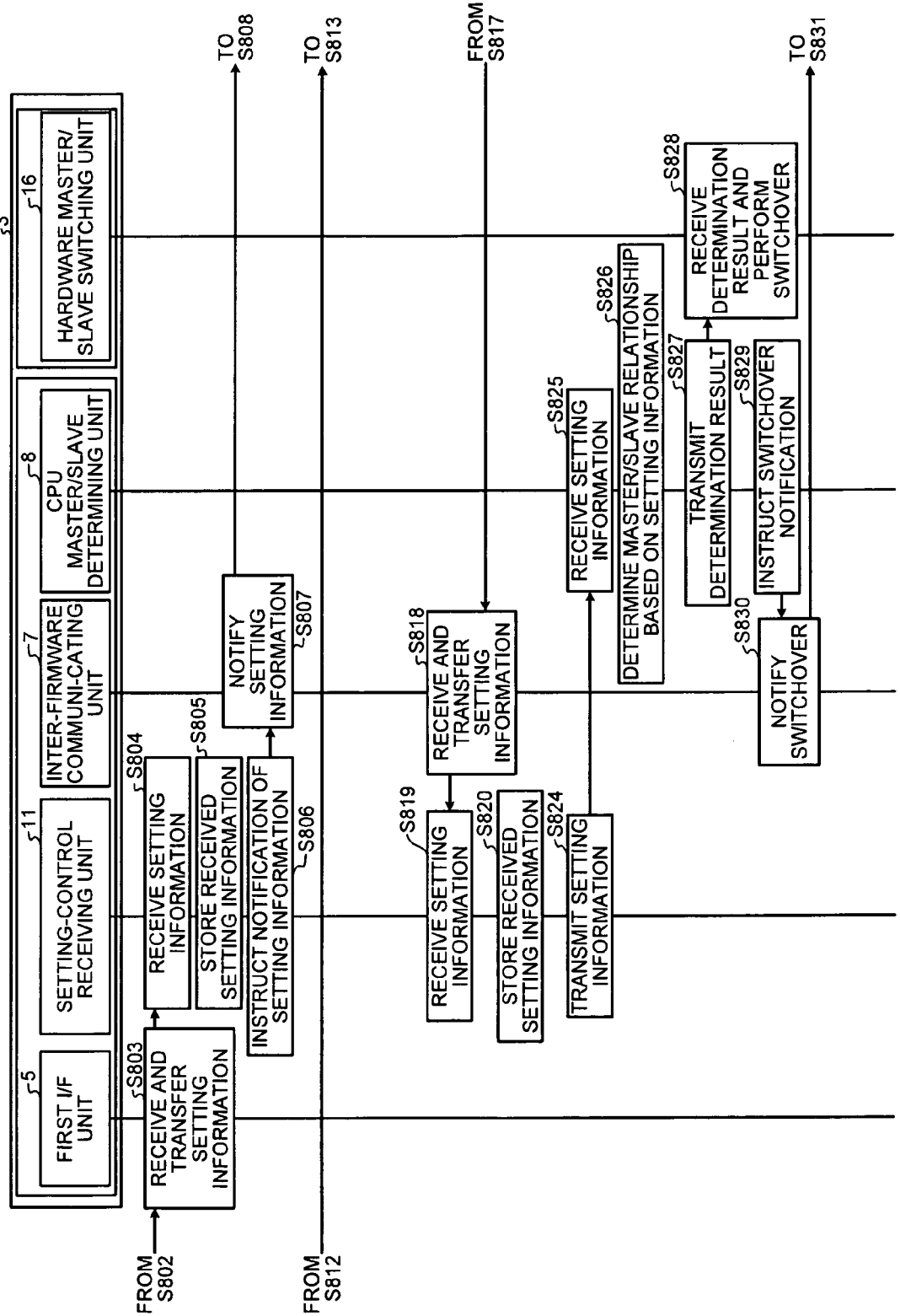

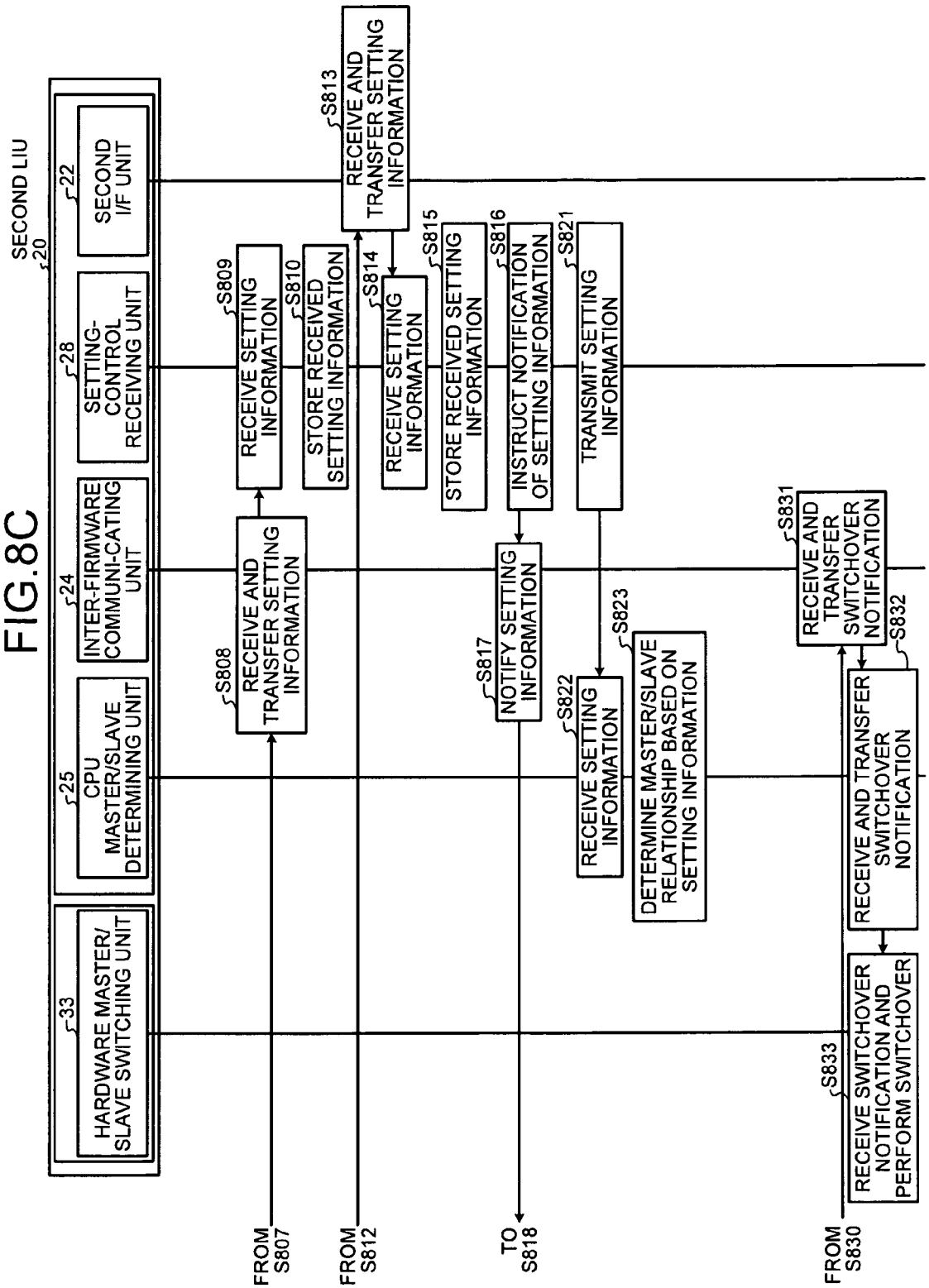

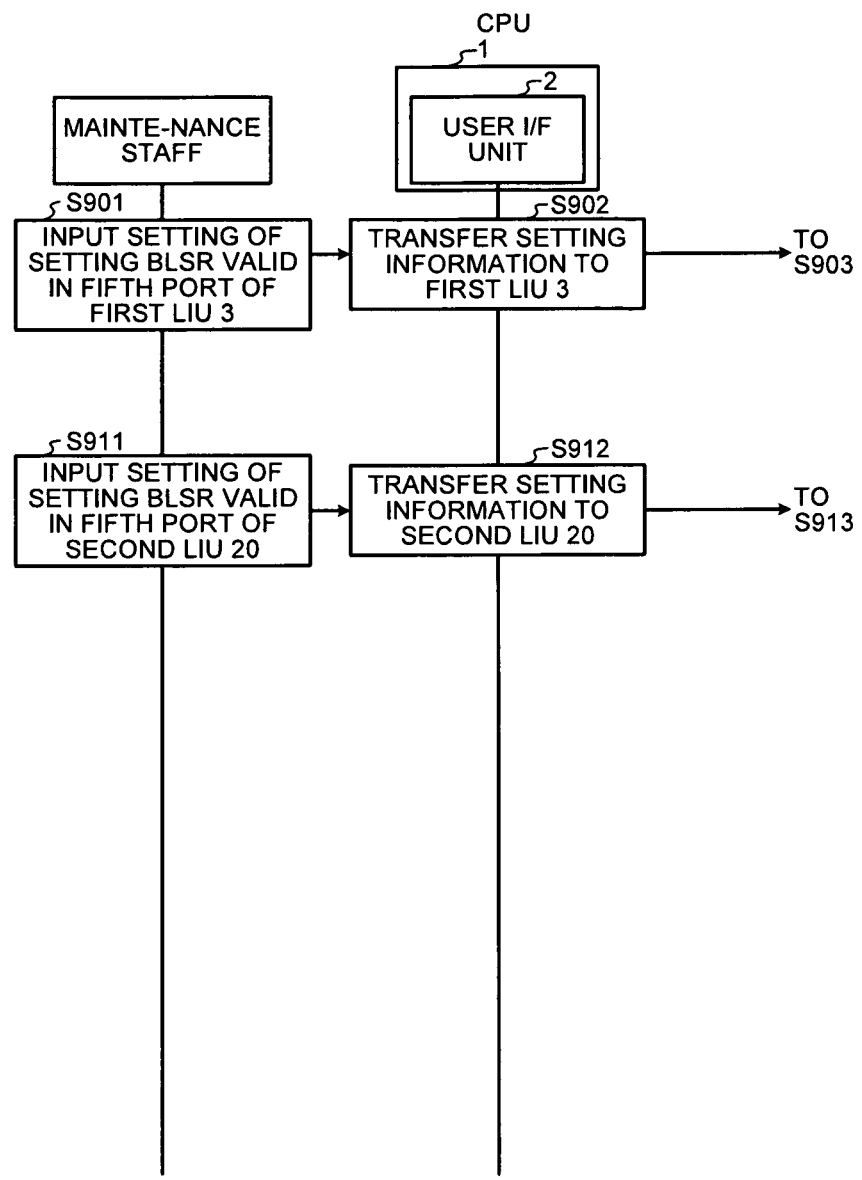

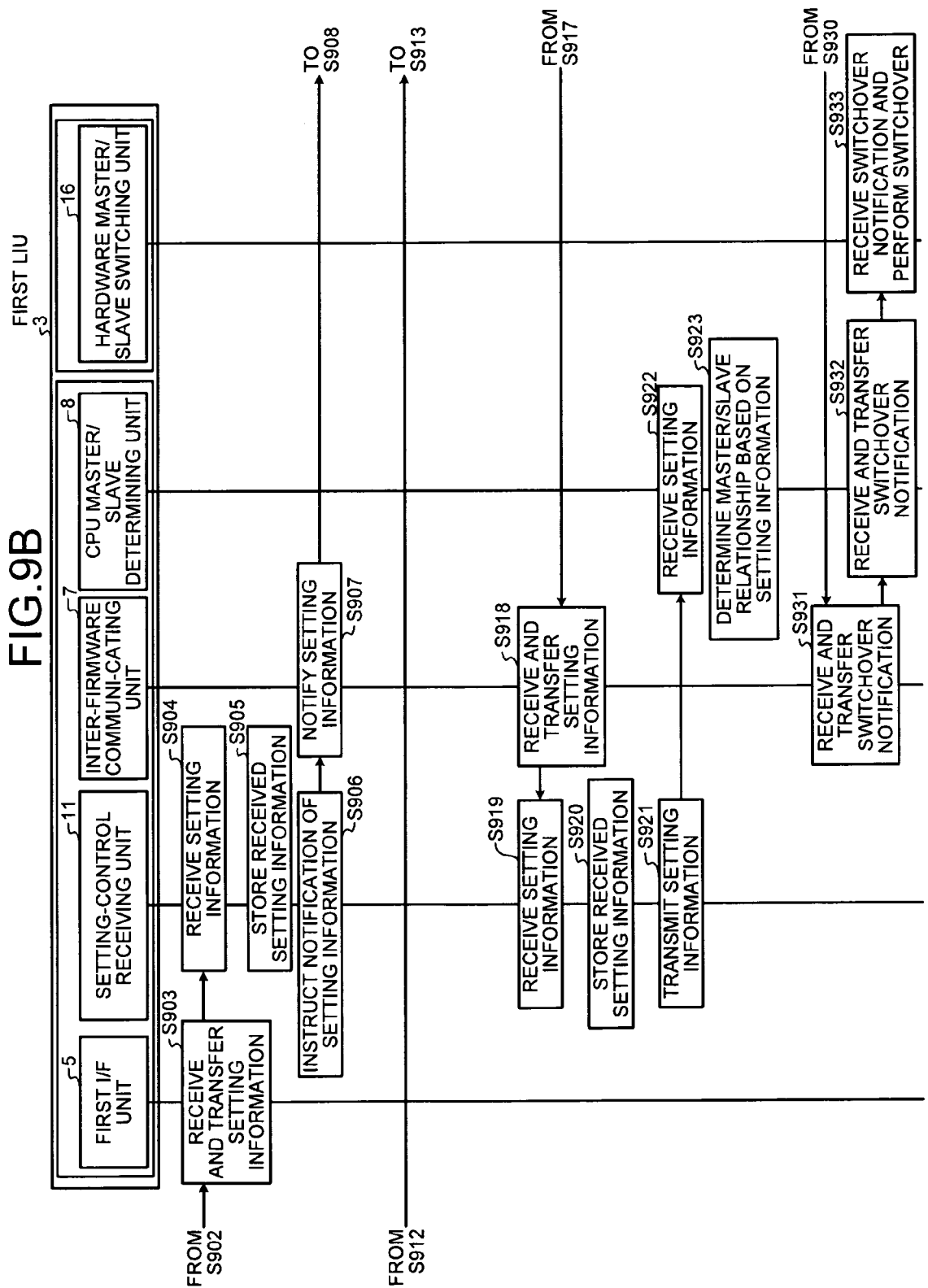

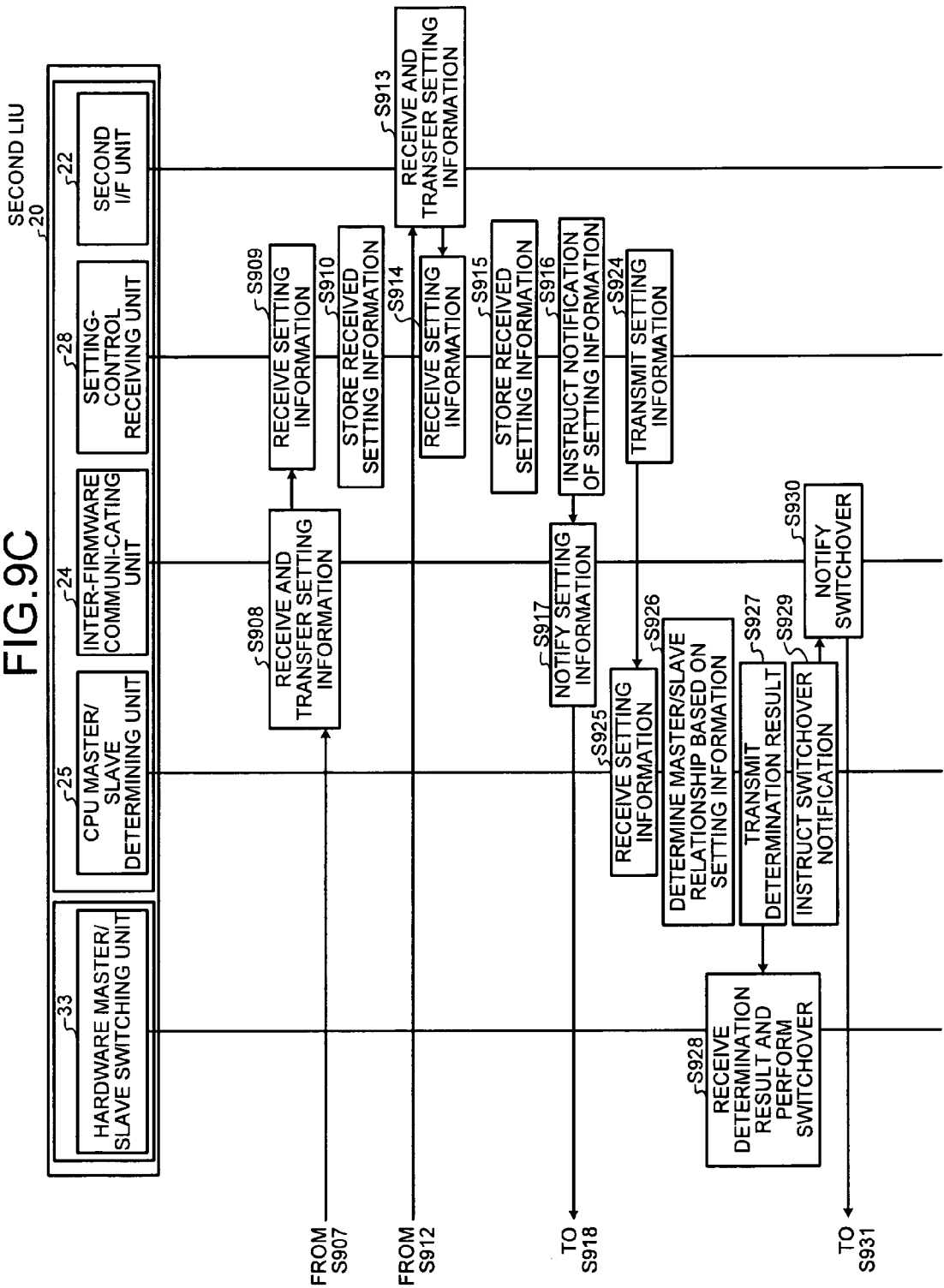

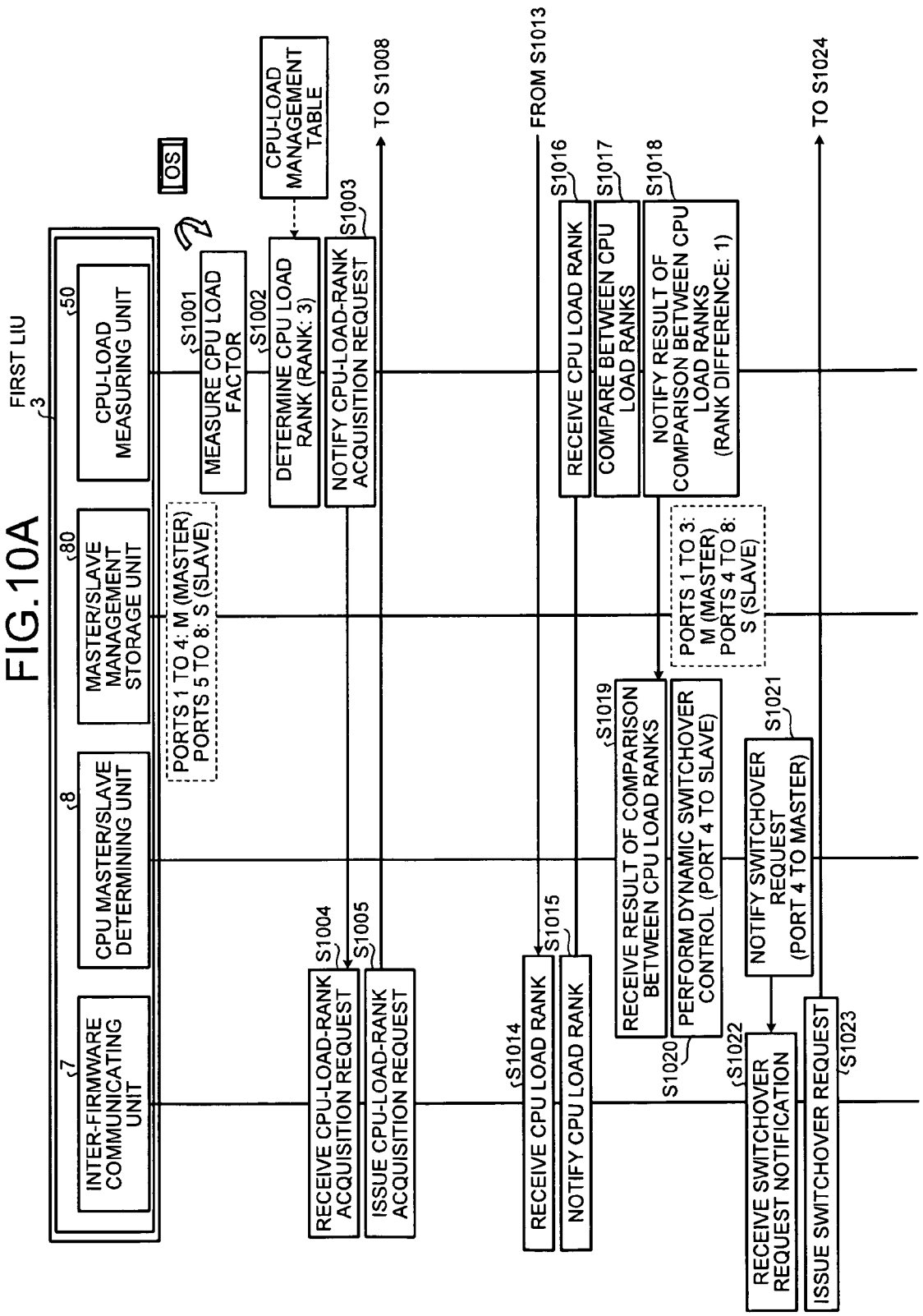

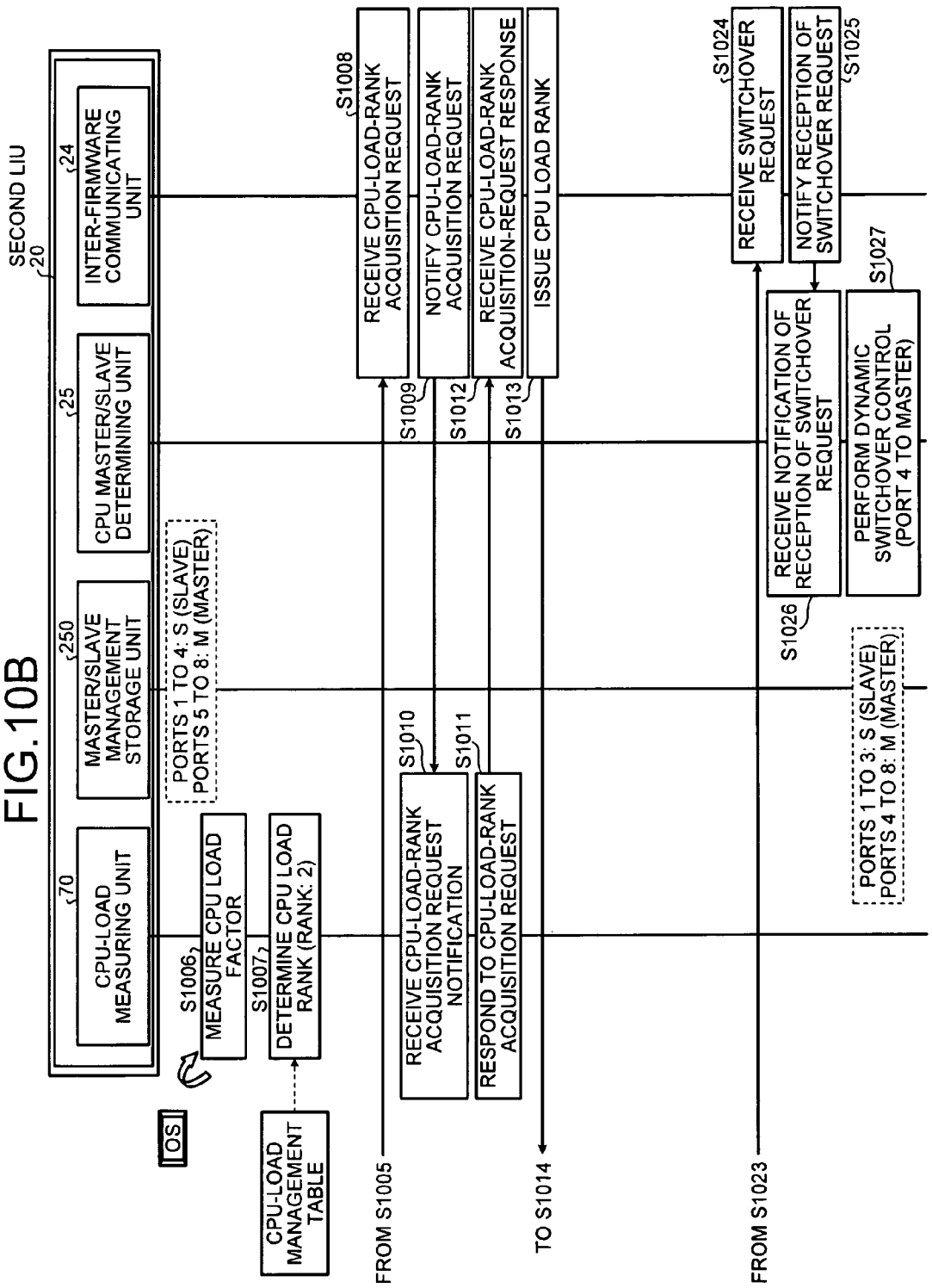

FIG.12A

| FIRST LIU | | | | | | | | |
|---|---|---|---|---|---|---|---|---|
| PORT NUMBER | 1 | 2 | 3 | 4 | 5 | 6 | 7 | 8 |
| STATUS | M | M | S | S | S | S | S | S |

FIG.12B

| SECOND LIU | | | | | | | | |
|---|---|---|---|---|---|---|---|---|
| PORT NUMBER | 1 | 2 | 3 | 4 | 5 | 6 | 7 | 8 |
| STATUS | S | S | M | M | M | M | M | M |

FIG.14A

| FIRST LIU | | | | | | | | |
|---|---|---|---|---|---|---|---|---|
| PORT NUMBER | 1 | 2 | 3 | 4 | 5 | 6 | 7 | 8 |
| STATUS | M | M | M | M | M | M | M | S |

FIG.14B

| SECOND LIU | | | | | | | | |
|---|---|---|---|---|---|---|---|---|
| PORT NUMBER | 1 | 2 | 3 | 4 | 5 | 6 | 7 | 8 |
| STATUS | S | S | S | S | S | S | S | M |

FIG.15

| CPU LOAD FACTOR (%) | CPU LOAD RANK | CPU LOAD COLLECTION_Flag |
|---|---|---|
| 0 TO 50 | 1 | ACT OR NOT ACT |
| 50 TO 60 | 2 | |
| 60 TO 70 | 3 | |
| 70 TO 80 | 4 | |
| 80 TO 90 | 5 | |
| 90 TO 100 | 6 | |

NORMAL OPERATION STATUS

OCCURRENCE OF COMMUNICATION FAULT

TRANSMISSION DEVICE AND SWITCHOVER PROCESSING METHOD

CROSS-REFERENCE TO RELATED APPLICATION(S)

This application is a continuation of International Application No. PCT/JP2007/072032, filed on Nov. 13, 2007, the entire contents of which are incorporated herein by reference.

FIELD

The embodiments discussed herein are directed to a transmission device and a switchover processing method performed in the transmission device.

BACKGROUND

At present, along with increased demand for high-capacity data transmission, a high-speed digital synchronous-transmission system has been spreading rapidly. Representative standards of the digital synchronous-transmission system are Synchronous Digital Hierarchy (SDH) defined by the International Telecommunication Union, Telecommunication Standardization Sector (ITU-T), and Synchronous Optical Network (SONET) defined by the American National Standards Institute (ANSI). Both standards define configurations of optical synchronous-communication systems and functions of transmission devices.

In the digital synchronous-transmission systems using SDH and SONET, there is generally used a synchronous multiple signal having a signal called "overhead" to perform monitoring and maintenance of a transmission device and a communication network, added to a main signal portion obtained by multiplexing a digitalized main signal.

Some of the digital synchronous-transmission systems employ "1+1 APS (Automatic Protection Switch)" function that achieves control of switchover from a currently-used line to an auxiliary line when a fault occurs in a network configured by a Bidirectional Line Switched Ring (BLSR) system that connects between transmission devices with a ring-shaped line of the currently-used line or the auxiliary line. By mapping APS byte (K1 byte or K2 byte) in an overhead of a synchronous multiplexed signal, when a fault occurs in the currently-used line, switchover control is performed to switch a system to a redundant system of automatically switching a transmission path from the currently-used line to the auxiliary line.

An outline of a switching process to a redundant system in a network configuration of the BLSR is briefly explained with reference to FIGS. 17A and 17B to FIGS. 20A and 20B. FIGS. 17A and 17B are schematic diagrams for explaining a switchover process of switching to a redundant system in the network configuration of the BLSR. FIG. 18 is a schematic diagram for explaining a configuration of a centralized CPU device. FIG. 19 is a schematic diagram for explaining a configuration of a distributed CPU device. FIGS. 20A and 20B are schematic diagrams for explaining problems of a conventional technique.

In the network configuration of the BLSR, in a normal operation state, a path in only one direction (either a clockwise direction or a counterclockwise direction) is used as a communication path of an optical signal. When a communication fault occurs, the path is switched to a path in a direction (an auxiliary side) opposite to the direction of the path used in the normal operation, thereby quickly responding to a line fault. For example, as illustrated in FIG. 17A, it is assumed that in a normal operation state, an optical signal from Node 4 to Node 2 is transmitted in a clockwise direction using a path via Node 3, in a ring network in which four optical transmission devices of Node 1 to Node 4 are incorporated.

When a communication fault occurs in a line between Node 4 and Node 3 in this state of normal operation, Node 3 transmits information of the fault occurrence to Node 4 via Node 2 and Node 1, as illustrated in FIG. 17B. Node 4 receives the information of the fault occurrence, and transmits an optical signal to Node 2, by switching the path so far used to the path at an opposite side (the auxiliary side). Specifically, the optical signal from Node 4 reaches Node 3 via Node 1 and Node 2, and is transmitted to Node 2 after returning from Node 3.

That is, in the network of the BLSR, an optical transmission device achieves switchover control by exchanging the APS byte (K1 byte or K2 byte) between this optical transmission device and the opposite optical transmission device. For example, when an optical transmission device detects a signal failure (SF) or a signal degradation (SD) as a fault at a receiving side, the optical transmission device notifies information of the device itself to the opposite device by using APS byte having stored these pieces of information, thereby achieving switchover to the auxiliary side within a switchover time 50 milliseconds defined by GR-253.

A configuration of an optical transmission device in the network of the BLSR is explained next with reference to FIG. 18. The configuration of an optical transmission device includes the configuration of a centralized CPU device as illustrated in FIG. 18.

As illustrated in FIG. 18, the configuration of the centralized CPU device includes a redundant configuration of a CPU unit that performs monitor control of the entire transmission devices, and a WEST LIU and an EAST LIU as line interface units having an external-line interface function to a currently-used line and an auxiliary line.

The WEST LIU and the EAST LIU include hardware respectively. The hardware receives APS byte from the currently-used line and the auxiliary line, notifies information of an SF and an SD to the CPU unit, and changes a switch according to instructions from the CPU unit. The WEST LIU and the EAST LIU include plural ports, respectively corresponding to the currently-used line and the auxiliary line.

In the configuration of the centralized CPU device, firmware that operates within a CPU of the CPU unit performs switchover control of a switch by aggregating information of the APS byte from the WEST LIU and the EAST LIU.

For example, when the hardware of the WEST LIU as an interface of the currently-used line detects an SF as a switchover cause, the hardware notifies the occurrence of the SF to the firmware of the CPU unit (see (1) in FIG. 18). The firmware of the CPU unit performs an APS determining process (a switchover determining process) based on the received information of the SF and the information of the APS byte from a second LIU (see (2) in FIG. 18), and performs switchover control of the switch to the hardware of the WEST LIU and the hardware of the EAST LIU (see (3) in FIG. 18). As a result, switch switchover as illustrated in FIG. 17B is performed.

However, in the configuration of the centralized CPU device, when the number of ports accommodated in the LIU increases or when plural switchover causes occur simultaneously, quick switchover cannot be performed for a line fault, because APS determining processes in the firmware of the CPU unit becomes congested.

In view of the above problems, there is a configuration of a distributed CPU device as a configuration of an optical transmission device in a network of a BLSR.

That is, as illustrated in FIG. 19, the configuration of the distributed CPU device includes a CPU unit, and the WEST LIU and the EAST LIU having a function of an external-line interface to a currently-used line and an auxiliary line, in a similar manner to that of the configuration of the centralized CPU device. However, CPUs are incorporated in distribution in the WEST LIU and the EAST LIU. Firmware that operates within the CPU of each LIU aggregates information of APS byte, and both pieces of firmware communicate with each other to perform switchover control of a switch by sharing each other's information.

In this case, one of the redundantly configured LIUs needs to perform a switchover determination by referencing information of the APS byte of both the currently-used line and the auxiliary line. A maintenance staff of an optical transmission device sets to the CPU unit that the EAST LIU performs a switchover determination, for example. The EAST LIU receives setting information via firmware within the CPU (a user interface (I/F) unit) of the CPU unit, and the self CPU independently performs a switchover process in the hardware, as a master CPU.

In the configuration of the distributed CPU device, for example, when the hardware of the WEST LIU as the interface of the currently-used line detects an SF as a switchover cause, the hardware notifies the occurrence of the SF to the firmware within the self CPU (see (1) in FIG. 19). The firmware of the WEST LIU notifies the occurrence of the switchover cause to the firmware in the CPU (the master CPU) of the EAST LIU, by communicating with the other firmware (see (2) in FIG. 19). The firmware of the EAST LIU performs an APS determining process (a switchover determining process) based on the switchover cause (the SF) sent from the WEST LIU and based on the information of the APS byte of the EAST LIU (see (3) in FIG. 19).

The firmware of the EAST LIU notifies switchover to the firmware of the WEST LIU as a result of the APS determining process, by communicating with the other firmware (see (4) in FIG. 19). The firmware of the WEST LIU and the firmware of the EAST LIU, respectively perform switchover control to the hardware itself, based on a result of determination by the firmware of the EAST LIU (see (5) in FIG. 19). As explained above, switchover control is performed based on the determining process of the CPU of the EAST LIU which functions as the master CPU, and the switch is changed as illustrated in FIG. 17B, for example.

As a technique of sharing information between CPUs, Japanese Patent Publication No. 06-30002 discloses a programmable controller that enables CPUs to share information by transfer of data from a memory at a master CPU side to a memory at a slave CPU side by direct memory access (DMA).

Similarly, Japanese Laid-open Patent Publication No. 08-202672 discloses a distributed multiprocessing system that enables CPUs to share information by transferring data from a master processor unit to plural slave units via a VERSA Module Eurocard bus (VME bus), between processor units each including a CPU and a memory (between one master unit and plural slave units).

However, the conventional techniques mentioned above have a problem such that, in an LIU that accommodates plural ports, when switchover control is to be performed due to simultaneous occurrence of faults in the plural ports, the processing load of a master CPU becomes high, and the CPU cannot perform a quick switchover process. This problem is briefly explained below with reference to FIGS. 20A and 20B.

That is, in a configuration as illustrated in FIGS. 20A and 20B, when only a master CPU at one-side LIU performs switchover control of "BLSR", the CPU cannot perform a quick switchover process within 50 milliseconds as defined by GR-253.

For example, as illustrated in FIG. 20A, when LIUs of an optical transmission device (a configuration of a distributed CPU device) that achieves the "BLSR" are redundantly configured such that each LIU accommodates five physical ports, only the master CPU of the LIU at one side needs to perform switchover control based on APS information in a combination of the five physical ports.

As illustrated in FIG. 20B, it is assumed that a ring network configured by 16 nodes (optical transmission devices) achieves "BLSR". In this case, after a master CPU incorporated in an LIU of node 1 detects information of a signal failure (SF) of an optical signal from Node 16, this master CPU needs to perform plural processes before completing switchover control. That is, the master CPU needs to perform switchover control of itself, to perform switchover control to Node 2 to Node 16, and to receive switchover responses from Node 2 to Node 16. Thus, the master CPU is required to have a high processing capacity.

In the conventional techniques mentioned above, a master CPU of an LIU at only one side can sometimes perform switchover within 50 milliseconds to simultaneous faults of four or a smaller number of ports. However, as illustrated in FIG. 20A, a master CPU of an LIU that accommodates five or more physical ports cannot perform by the master CPU itself a quick switchover process within 50 milliseconds to simultaneous faults of all physical ports.

The present invention has been achieved to solve the problems of the conventional technique described above, and an object of the present invention is to provide an optical transmission device, a switchover processing method, and a switchover processing program which are capable of performing a quick switchover process to simultaneous occurrence of faults in plural ports, dynamically changing a master CPU according to a load status of a CPU, and preventing a main-signal failure time from becoming long.

SUMMARY

According to an aspect of an embodiment of the invention, a transmission device in which hardware installed in each of a pair of line cards having a redundant configuration by accommodating plural ports acquires for each port each piece of fault information of a currently-used line and an auxiliary line having a redundant line, a CPU incorporated in each line card having the redundant configuration determines for each port switchover control of the redundant line based on the fault information acquired, and the hardware performs for each port switchover of the redundant line and transmits an optical signal of an SDH/SONET system by a ring network, based on a switchover control determination by the CPU, includes a master/slave CPU-distribution setting unit that sets a CPU incorporated in each line card having the redundant configuration as a master CPU that determines switchover control of the redundant line in distribution for each port, and sets as a slave CPU of a predetermined port a CPU incorporated in a line card at the opposite side of the line card in which the CPU incorporated as the master CPU of the predetermined port is set; a CPU-load-status measuring unit that measures a load status of a CPU incorporated in each line card having the redundant configuration; and a master/slave CPU-setting changing unit that compares between CPU load statuses of line cards measured by the CPU-load-status measuring unit, and changes a CPU setting such that a CPU in a low load status is set more as a master CPU in distribution to each port.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 1A to 1C are schematic diagrams for explaining an outline of an optical transmission device according to a first embodiment of the present invention;

FIG. 2 is a schematic diagram for explaining the outline of the optical transmission device according to the first embodiment;

FIGS. 5A and 5B are schematic diagrams for explaining a master/slave management storage unit according to the first embodiment;

FIG. 6 is a configuration example of a CPU-load management table according to the first embodiment;

FIGS. 7A and 7B are schematic diagrams for explaining the master/slave management storage unit according to the first embodiment;

FIGS. 8A to 8C are sequence diagrams of a setting process flow to start an operation of the optical transmission device according to the first embodiment;

FIGS. 9A to 9C are sequence diagrams of a setting process flow to start an operation of the optical transmission device according to the first embodiment;

FIGS. 10A and 10B are sequence diagrams of a dynamic switchover process flow of the optical transmission device according to the first embodiment;

FIGS. 12A and 12B are schematic diagrams for explaining a master/slave management storage unit according to the second embodiment;

FIGS. 14A and 14B are schematic diagrams for explaining a master/slave management storage unit according to the third embodiment;

FIG. 15 is a configuration example of a CPU-load management table according to a fourth embodiment of the present invention;

DESCRIPTION OF EMBODIMENT(S)

Figure 3:
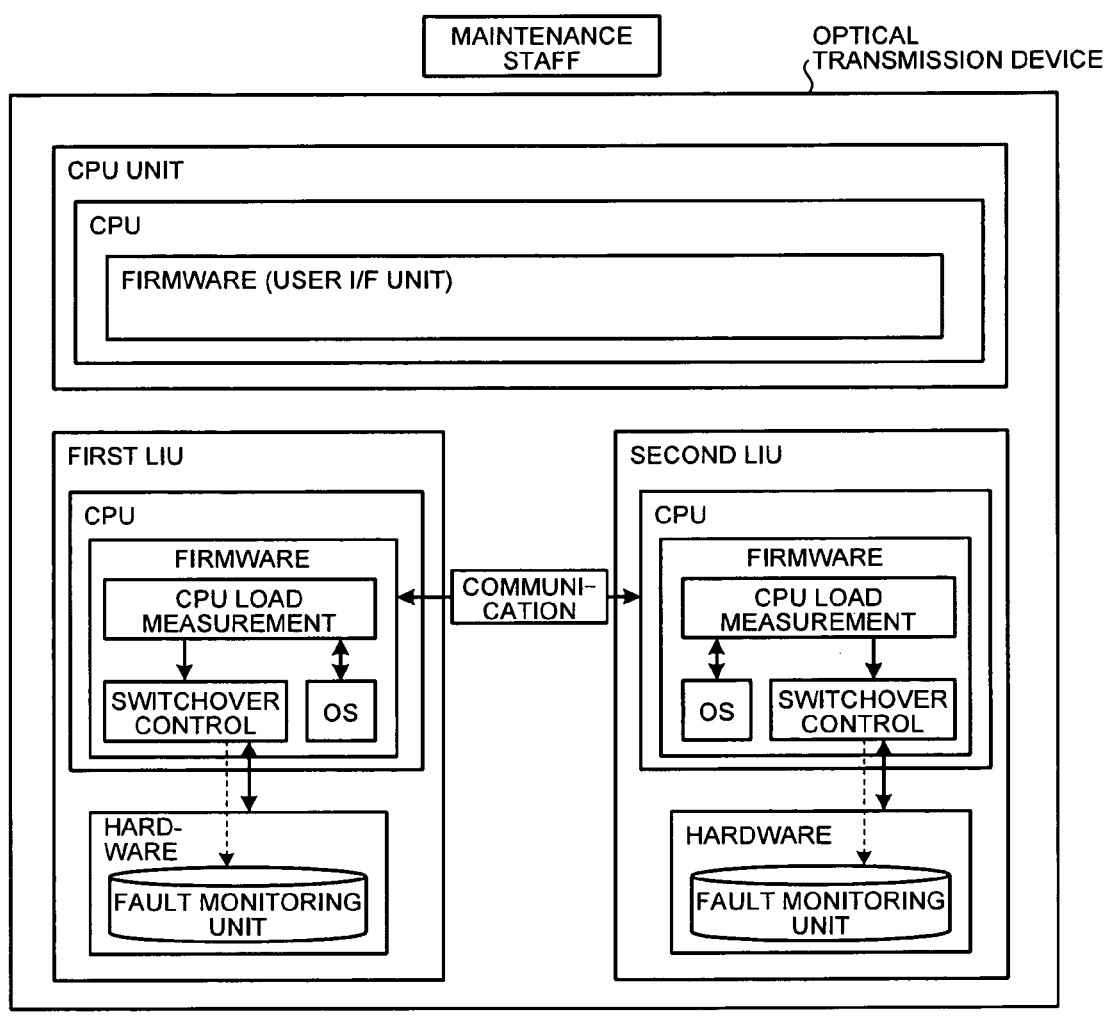
FIG. 3 is a schematic diagram for explaining characteristics of the optical transmission device according to the first embodiment.

Preferred embodiments of the present invention will be explained with reference to accompanying drawings.

In the following explanations, an optical transmission device is exemplified as the transmission device according to the present invention. An outline and characteristics of an optical transmission device according to a first embodiment of the present invention are explained first, and a configuration and processes of the optical transmission device are explained next. Other embodiments of the present invention are then explained.

[a] First Embodiment

Outline and Characteristics of Optical Transmission Device (First Embodiment)

An outline of the optical transmission device according to the first embodiment is explained first. FIGS. 1A to 1C and FIG. 2 are schematic diagrams for explaining the outline of the optical transmission device according to the first embodiment.

As illustrated in FIGS. 1A to 1C, the optical transmission device according to the first embodiment includes a CPU unit, a first LIU unit, and a second LIU unit. Hardware is installed in each of a pair of LIUs (a first LIU and a second LIU) having a redundant configuration by accommodating plural ports. The hardware acquires for each port each piece of fault information of a currently-used line and an auxiliary line constituting a redundant line. A CPU incorporated in each LIU having the redundant configuration determines for each port switchover control of the redundant line based on the acquired fault information. The hardware switches the redundant line for each port based on a switchover control determination by the CPU, and transmits an optical signal of the SDH/SONET system by a ring network. The "LIU" corresponds to "line card" in the claims.

That is, in the optical transmission device according to the first embodiment, the first LIU and the second LIU having the redundant configuration accommodate eight physical ports including a first port to an eighth port, and transmit an optical signal to the opposite optical transmission device by a ring network, as illustrated in FIG. 1A, for example.

The optical transmission device according to the first embodiment performs a quick switchover process to simultaneous occurrence of faults in plural ports. Specifically, the optical transmission device according to the first embodiment sets a CPU incorporated in each LIU having the redundant configuration as a master CPU determining switchover control of the redundant line in distribution for each port, and sets as a slave CPU of a predetermined port a CPU incorporated in the LIU at the opposite side of the LIU in which the CPU incorporated as the master CPU of the predetermined port is set.

That is, as illustrated in FIG. 1B, in the first port to the fourth port, the CPU incorporated in the first LIU becomes a master CPU that performs switchover control. In the fifth port to the eighth port, the CPU incorporated in the second LIU becomes a master CPU that performs switchover control. On the other hand, in the fifth port to the eighth port, the CPU incorporated in the first LIU becomes a slave CPU. In the first port to the fourth port, the CPU incorporated in the second LIU becomes a slave CPU.

In the optical transmission device according to the first embodiment, switchover control based on fault information from a port in which a CPU set as a master CPU manages the port is determined with priority. For example, as illustrated in FIG. 1C, when faults occur simultaneously in all of the first port to the eighth port, the CPU incorporated in the first LIU determines as the master CPU the switchover control with priority in the first port to the fourth port, and the CPU incorporated in the second LIU determines as the master CPU the switchover control with priority in the fifth port to the eighth port. For example, when the CPU incorporated in the second LIU does not yet complete the process in the fifth port to the eighth port after the CPU incorporated in the first LIU completes as the master CPU the switchover control in the first port to the fourth port, the CPU incorporated in the first LIU can continuously perform as a slave CPU the process of the switchover control.

The optical transmission device according to the first embodiment communicates fault information acquired by hardware installed in the LIU of the redundant configuration with the other hardware installed in a line card at the opposite side.

That is, the hardware of the first LIU communicates fault information stored in the APS byte acquired by this hardware to the hardware of the second LIU, and the hardware of the second LIU communicates fault information stored in the APS byte acquired by this hardware to the hardware of the first LIU (see (1) in FIG. 2).

In the optical transmission device according to the first embodiment, hardware installed in the LIU in the redundant configuration stores acquired fault information, and further stores fault information sent from the hardware installed in the LIU at the opposite side.

That is, a fault monitoring unit that stores therein fault information acquired by hardware is set in the hardware of the first LIU and the hardware of the second LIU, respectively. Fault information acquired by each hardware is updated and shared by communications between the hardware (see (2) in FIG. 2).

In the optical transmission device according to the first embodiment, a CPU set as a master CPU in a predetermined port sets hardware under control of the master CPU as master hardware, and sets hardware under control of the CPU determined as a slave CPU in the predetermined port as slave hardware.

That is, in the first port to the fourth port, the CPU incorporated in the first LIU set as a master CPU sets hardware under self control as master hardware in the first port to the fourth port, and sets hardware under control of the CPU incorporated in the second LIU set as a slave CPU as slave hardware in the first port to the fourth port (see (3) in FIG. 2).

In the fifth port to the eighth port, the CPU incorporated in the second LIU set as a master CPU sets hardware under self control as master hardware in the fifth port to the eighth port, and sets hardware under control of the CPU incorporated in the first LIU set as a slave CPU as slave hardware in the fifth port to the eighth port (see (4) in FIG. 2).

In the optical transmission device according to the first embodiment, a CPU determined as a master CPU controls switchover of the redundant line to hardware set as master hardware. That is, in the first port to the fourth port, as illustrated in (5) in FIG. 2, the firmware that operates within the CPU of the first LIU set as a master CPU independently performs switchover control, and the master hardware under control performs switchover between the currently-used line and the auxiliary line according to the switchover control of the firmware. In the fifth port to the eighth port, as illustrated in (6) in FIG. 2, the firmware that operates within the CPU of the second LIU set as a master CPU independently performs switchover control, and the master hardware under control performs switchover between the currently-used line and the auxiliary line according to the switchover control of the firmware.

As described above, the optical transmission device according to the first embodiment distributes master CPUs to all ports. Therefore, even when a master CPU receives fault information stored in the APS byte from all ports, concentration of switchover control to any one of the LIUs of the redundant configuration can be avoided, and a quick switchover process can be performed for simultaneous occurrence of faults in plural ports.

However, a main-signal failure time sometimes becomes long in the switch control of the optical transmission device described above.

Specifically, the optical transmission device described above determines a master CPU based on setting information input by a maintenance staff at a BLSR-validity setting time. For example, in the first port to the fourth port, a CPU incorporated in the first LIU is determined as a master CPU based on setting information input by the maintenance staff at a BLSR-validity setting time. In the fifth port to the eighth port, a CPU incorporated in the second LIU is determined as a master CPU based on setting information input by the maintenance staff at a BLSR-validity setting time (see FIG. 1A).

Therefore, when faults occur simultaneously in plural ports in a situation that the load of the CPU of the first LIU is high for some reason, a switchover process in a port in which the CPU of the first LIU is used as a master CPU is delayed, and a main-signal failure time becomes long.

The optical transmission device according to the first embodiment has a main characteristic in preventing a main-signal failure time from becoming long. The main characteristic is explained below with reference to FIG. 3. FIG. 3 is a schematic diagram for explaining the characteristics of the optical transmission device according to the first embodiment.

As illustrated in FIG. 3, the optical transmission device according to the first embodiment periodically measures a load status of the CPU by the firmware that operates within the CPU of the first LIU and by the firmware that operates within the CPU of the second LIU, respectively via each operating system. The optical transmission device performs switchover control of a master CPU according to the load status of the CPU measured by the firmware in each LIU.

For example, when the load of the CPU of the second LIU is higher than that of the CPU of the first LIU, a setting of the CPUs is dynamically changed such that a master CPU that performs switchover control in a predetermined port is switched to a slave CPU of the first LIU, and a slave CPU related to the predetermined port is switched to a master CPU of the second LIU.

Accordingly, the optical transmission device according to the first embodiment can dynamically change the CPU according to a load status of the CPU, and can prevent a main-signal failure time from becoming long, as the main characteristic as described above.

Configuration of Optical Transmission Device (First Embodiment)

Figure 4:
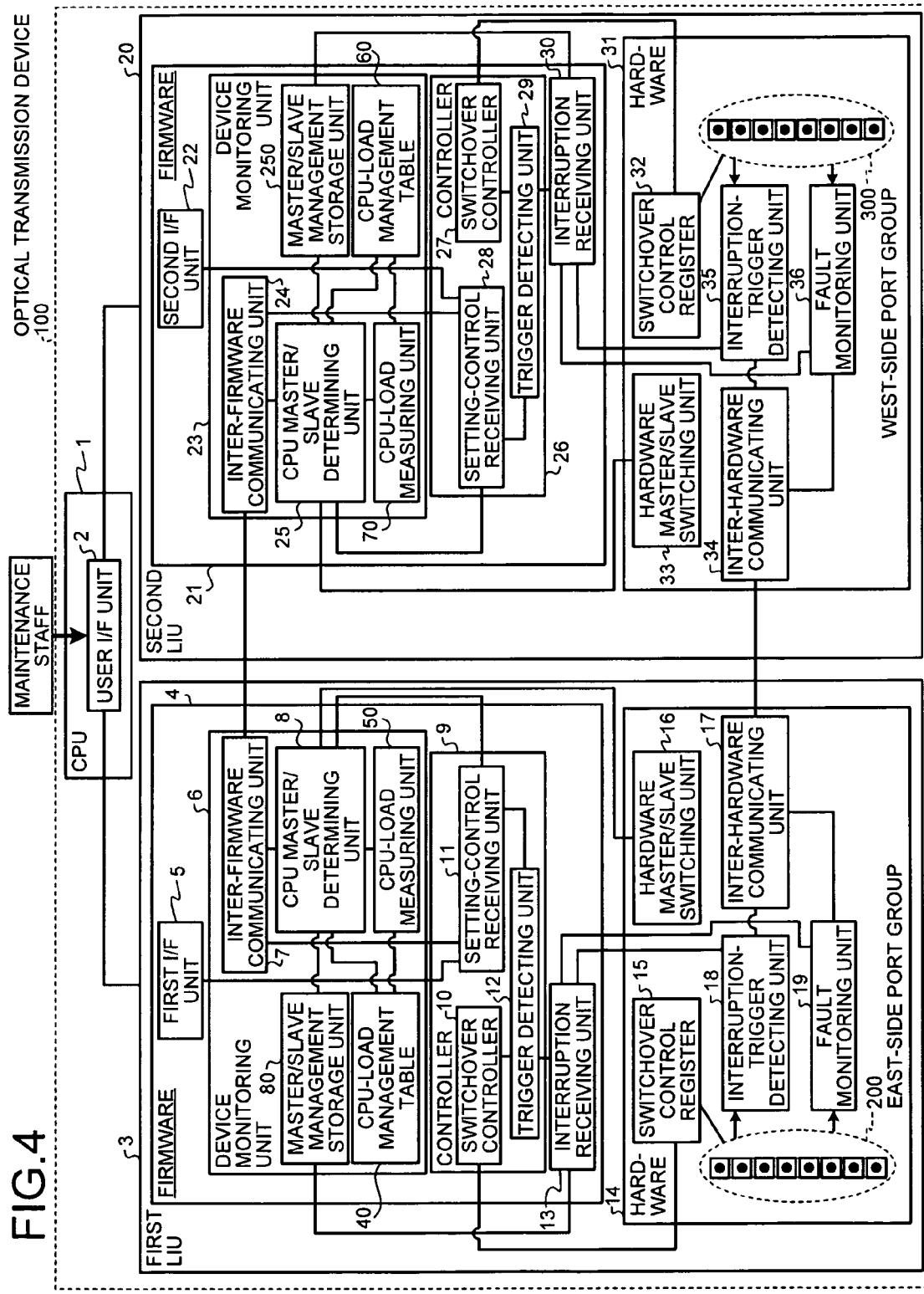
FIG. 4 is a block diagram of a configuration of the optical transmission device according to the first embodiment.

A configuration of the optical transmission device according to the first embodiment is explained next with reference to FIG. 4 to FIGS. 7A and 7B. FIG. 4 is a block diagram of the configuration of the optical transmission device according to the first embodiment. FIGS. 5A and 5B are schematic diagrams for explaining a master/slave management storage unit according to the first embodiment. FIG. 6 is a configuration example of a CPU-load management table according to the first embodiment. FIGS. 7A and 7B are schematic diagram for explaining the master/slave management storage unit according to the first embodiment.

As illustrated in FIG. 4, an optical transmission device 100 according to the first embodiment includes a CPU 1, and a first LIU 3 and a second LIU 20 as a pair of LIUs having a redundant configuration. In the first embodiment, the first LIU 3 is an EAST-side LIU, and the second LIU 20 is a WEST-side LIU.

The CPU 1 includes a user I/F unit 2. The user I/F unit 2 transfer controls setting information of "setting a BLSR valid in a first port of the first LIU 3 to" and "setting a BLSR valid in a fifth port of the second LIU 20" from a maintenance staff of the optical transmission device 100, to the first LIU 3 and the second LIU 20.

The user I/F unit 2 also receives CPU-load setting information as a setting of a CPU load rank according to a CPU load factor, from a maintenance staff of the optical transmission device 100, and transfer controls this information to the first LIU 3 and the second LIU 20. The user I/F unit 2 also receives command information to instruct the LIUs to set valid or invalid dynamic switchover of a master CPU, from the maintenance staff of the optical transmission device 100, and transfer controls this information to the first LIU 3 and the second LIU 20.

The first LIU 3 includes firmware 4 and hardware 14. The firmware 4 operates within a CPU incorporated in the first LIU, and performs switchover control of a line. The hardware 14 is installed in the first LIU 3, detects fault information from the line from an EAST-side port group 200, and switches a switch according to switchover control from the firmware 4. The EAST-side port group 200 and a WEST-side port group 300 include the eight physical ports of the first port to the eighth port as illustrated in FIG. 1A.

The firmware 4 includes a first I/F unit 5, a device monitoring unit 6, a controller 9, and an interruption receiving unit 13.

The first I/F unit 5 transfers information transferred from the user I/F unit 2 (for example, setting information to set a BLSR valid in each LIU, CPU-load setting information, and command information to instruct setting valid or invalid dynamic switchover), to a setting-control receiving unit 11, or a CPU-load measuring unit 50 (described later).

The device monitoring unit 6 includes an inter-firmware communicating unit 7, a CPU master/slave determining unit 8, a master/slave management storage unit 80, a CPU-load management table 40, and the CPU-load measuring unit 50. The inter-firmware communicating unit 7 communicates various kinds of information (for example, BLSR-validity setting information, and CPU-load rank information) with firmware 21 of the second LIU 20.

The CPU master/slave determining unit 8 corresponds to "master/slave CPU-distribution setting unit" in the claims, and the CPU-load management table 40 corresponds to "CPU-load-rank-information managing unit" in the claims. The CPU-load measuring unit 50 corresponds to "CPU-load-status measuring unit" in the claims.

The CPU master/slave determining unit 8 determines for each port whether a CPU that stores the firmware 4 is a master CPU or a slave CPU, based on information from the setting-control receiving unit 11 (described later) and information stored in the master/slave management storage unit 80 (described later). The CPU master/slave determining unit 8 updates setting information stored in the master/slave management storage unit 80 (described later). That is, the CPU master/slave determining unit 8 determines for each port whether a CPU is a master CPU that independently performs switchover control or a slave CPU that does not independently perform switchover control.

When the CPU master/slave determining unit 8 receives from a maintenance staff via the first I/F unit 5 command information for instructing to set valid dynamic switchover of a master CPU between the LIUs, the CPU master/slave determining unit 8 sets a flag (for example, "ACT") to the CPU-load management table 40 (described later) to set the dynamic switchover valid. On the other hand, when the CPU master/slave determining unit 8 receives from the maintenance staff command information for instructing to set invalid dynamic switchover, the CPU master/slave determining unit 8 sets a flag (for example "NOT ACT") to the CPU-load management table 40 (described later) to set the dynamic switchover invalid.

When the CPU master/slave determining unit 8 receives a result of comparison between a self-CPU load rank and a CPU load rank of the second LIU 20 from the CPU-load measuring unit 50 (described later), the CPU master/slave determining unit 8 performs dynamic switchover control to the master CPU or the slave CPU based on the result of comparison.

Specifically, when the CPU master/slave determining unit 8 receives a size relationship of the received CPU load ranks such as the self-CPU load rank "3">the CPU load rank "2" of the second LIU 20, and a difference between the CPU load ranks such as "3"–"2"="1" as a result of comparison, the CPU master/slave determining unit 8 determines to change the self CPU to a slave CPU in one of the first port to the fourth port in which the self CPU is set as a master CPU in the master/slave management storage unit 80. That is, a CPU in the second LIU 20 in which a CPU load is lower than that in the first LIU 3 is set as a master CPU, instead of the master CPU set in the first LIU 3, thereby dispersing the load.

When the CPU master/slave determining unit 8 determines to use the self CPU as a slave CPU in the fourth port, for example, as illustrated in FIG. 7A, the CPU master/slave determining unit 8 changes the setting information stored in the master/slave management storage unit 80 to "S" that indicates the CPU to function as a slave CPU in the fourth port, notifies a determination result to a hardware master/slave switching unit 16 (described later), and changes the setting to cause the fourth port to function as slave hardware.

Subsequently, the CPU master/slave determining unit 8 issues switchover request to a CPU master/slave determining unit 25 of the second LIU 20 to request the CPU to function as a master CPU in the fourth port, via the inter-firmware communicating unit 7.

The CPU master/slave determining unit 25 of the second LIU 20 receives the switchover request from the CPU master/slave determining unit 8, and performs dynamic switchover to function as a master CPU in the fourth port in an identical order to the above order of the CPU master/slave determining unit 8 (see FIG. 7B).

The master/slave management storage unit 80 stores a port in which the CPU that accommodates the firmware 4 is switchover-controlled as a master CPU. For example, as illustrated in FIG. 5A, the master/slave management storage unit 80 stores setting information that the CPU that stores therein the firmware 4 functions as a master CPU (M) in the first port to the fourth port, and the CPU that stores therein the firmware 4 functions as a slave CPU (S) in the fifth port to the eighth port.

A master/slave management storage unit 250 of the second LIU 20 stores a port in which the CPU that accommodates the firmware 21 is switchover-controlled as a master CPU. For example, as illustrated in FIG. 5B, the master/slave management storage unit 250 stores setting information "S" indicating that the CPU that stores the firmware 21 functions as a slave CPU in the first port to the fourth port, and setting information "M" indicating that the CPU that stores the firmware 21 functions as a master CPU in the fifth port to the eighth port, by relating these pieces of setting information to port numbers.

As illustrated in FIG. 6, the CPU-load management table 40 receives a setting of CPU load ranks from the CPU-load measuring unit 50, and stores these CPU load ranks (for example, a setting of CPU load factors "0% to 10%" as a CPU load rank "1") ranked corresponding to a CPU load factor at every 10% interval in the order of a low CPU load factor starting from 0%. The CPU-load management table 40 receives a setting of a flag (for example, "ACT") that sets dynamic switchover to valid or a flag (for example, "NOT ACT") that sets dynamic switchover to invalid from the CPU master/slave determining unit 8, and stores this setting.

The CPU-load measuring unit 50 receives CPU load information from the maintenance staff via the first I/F unit 5, and sets the CPU load information in the CPU-load management table (described later). The CPU-load measuring unit 50 periodically measures a load factor of the CPU that accommodates the firmware 4, via a control program of the operating system (OP) and the like, and determines a CPU load rank corresponding to the measured CPU load factor based on the CPU-load management table 40.

When a dynamic switchover flag of the CPU-load management table is valid, the CPU-load measuring unit 50 issues a CPU-load-rank acquisition request to a CPU-load measuring unit 70 of the second LIU 20 via the inter-firmware communicating unit 7 to request acquisition of a CPU load rank.

When the CPU load rank from the CPU-load measuring unit 70 of the second LIU 20 is received, the CPU-load measuring unit 50 compares the self-CPU load rank with the CPU load rank of the second LIU 20, and obtains a result of comparison. The CPU-load measuring unit 50 notifies the CPU master/slave determining unit 8 of information relevant to a size relationship of the acquired CPU load ranks (for example, the self-CPU load rank "3">the CPU load rank "2" of the second LIU 20), and a difference between the CPU load ranks ("3"−"2"="1").

The controller 9 includes a switchover controller 10, the setting-control receiving unit 11, and a trigger detecting unit 12.

The setting-control receiving unit 11 receives and stores setting information transferred from the first I/F unit 5, transfers the stored setting information to the inter-firmware communicating unit 7 and the CPU master/slave determining unit 8, and receives and stores the setting information transferred from the inter-firmware communicating unit 7.

The trigger detecting unit 12 receives controls fault information aggregated by the interruption receiving unit 13 (described later) and determines switchover on the information, and notifies the switchover determination to the switchover controller 10.

The switchover controller 10 receives a switchover determination result determined by the trigger detecting unit 12, and instructs a switchover control to a switchover control register 15 (described later).

The interruption receiving unit 13 receives an interruption notification from an interruption-trigger detecting unit 18 (described later), and aggregates by referencing the master/slave management storage unit 80 fault information in the ports (the first port to the fourth port) in which the CPU of the first LIU is set as a master CPU. For example, the interruption receiving unit 13 aggregates information of a signal failure (SF) or a signal degradation (SD) in the first port to the fourth port, for example.

The hardware 14 includes the switchover control register 15, the hardware master/slave switching unit 16, an inter-hardware communicating unit 17, the interruption-trigger detecting unit 18, and a fault monitoring unit 19.

The fault monitoring unit 19 receives fault information stored in the APS byte from the EAST-side port group 200, and stores the received information. The fault monitoring unit 19 receives fault information that a fault monitoring unit 36 that constitutes hardware 31 of the second LIU 20 receives from the WEST-side port group 300, from the inter-hardware communicating unit 17 (described later), and stores the received fault information.

The inter-hardware communicating unit 17 communicates fault information acquired by hardware installed in the LIUs of the redundant configuration, to the hardware installed in the line card at the opposite side. That is, the inter-hardware communicating unit 17 transmits fault information stored in the fault monitoring unit 19 and an interruption notification detected by the interruption-trigger detecting unit 18 (described later), to an inter-hardware communicating unit 34 of the second LIU 20, and receives fault information stored in the fault monitoring unit 36 of the second LIU 20 and an interruption notification detected by an interruption-trigger detecting unit 35 (described later), from the inter-hardware communicating unit 34.

The interruption-trigger detecting unit 18 receives fault information stored in the APS byte from the EAST-side port group 200, detects this fault information as an interruption notification, and transmits the interruption notification to the interruption receiving unit 13, in a similar manner to that of the fault monitoring unit 19. The interruption-trigger detecting unit 18 transmits the detected interruption notification to the second LIU 20 by using the inter-hardware communicating unit 17.

The hardware master/slave switching unit 16 sets the hardware 14 as master hardware or slave hardware based on a result of determination made by the CPU master/slave determining unit 8.

The switchover control register 15 performs switchover according to an instruction of the switchover controller 10. For example, the switchover control register 15 switches a switch according to the instruction of the switchover controller 10, to receive an optical signal with the auxiliary line instead of the currently-used line.

The second LIU 20 at the opposite side of the first LIU 3 has an identical configuration to that of the first LIU 3 as illustrated in FIG. 4. Because respective constituent units have the same function as those of the first LIU 3, explanations thereof will be omitted.

Process of Optical Transmission Device (First Embodiment)

A process flow of the optical transmission device according to the first embodiment is explained next with reference to FIGS. 8A to 8C, 9A to 9C, 10A, and 10B. FIGS. 8A to 8C and 9A to 9C are sequence diagrams of a setting process flow to start an operation of the optical transmission device according to the first embodiment. FIGS. 10A and 10B are sequence diagrams of a dynamic switchover process flow of the optical transmission device according to the first embodiment.

Setting Process when Starting Operation (First Embodiment)

A setting process flow when starting an operation of the optical transmission device according to the first embodiment is explained first with reference to FIGS. 8A to 8C and 9A to 9C.

As illustrated in FIGS. 8A to 8C, when a maintenance staff of the optical transmission device 100 according to the first embodiment inputs to the CPU 1 a setting of setting the BLSR valid in the first port of the first LIU 3 (Step S801), the user I/F unit 2 transfers received setting information to the first LIU 3 (Step S802), and the first I/F unit 5 of the first LIU 3 transfers the setting information to the setting-control receiving unit 11 (Step S803).

The setting-control receiving unit 11 receives the setting information (Step S804), stores the received setting information (Step S805), and instructs the inter-firmware communicating unit 7 to notify the received setting information to the second LIU 20 (Step S806). The inter-firmware communicating unit 7 notifies the setting information to an inter-firmware communicating unit 24 (Step S807).

Next, the inter-firmware communicating unit 24 receives the setting information from the inter-firmware communicating unit 7, and transfers the received setting information to a setting-control receiving unit 28 (Step S808). The setting-control receiving unit 28 receives the setting information (Step S809), and stores the received setting information (Step S810).

The firmware 4 installed in the CPU of the first LIU 3 stores information that the first port of the first LIU 3 is registered as an exclusive port of the BLSR. The firmware 21 installed in the CPU of the second LIU 20 receives and stores the information that the first port of the first LIU 3 is registered as an exclusive port of the BLSR, by inter-firmware communication.

The maintenance staff of the optical transmission. device 100 according to the first embodiment inputs the CPU 1 a setting that the BLSR is set valid in the first port of the second LIU 20 (Step S811), and the user I/F unit 2 transfers the received setting information to the second LIU 20 (Step S812). A second I/F unit 22 of the second LIU 20 then transfers the setting information to the setting-control receiving unit 28 (Step S813).

Next, the setting-control receiving unit 28 receives the setting information (Step S814), stores the received setting information (Step S815), and instructs the inter-firmware communicating unit 24 to notify the received setting information to the first LIU 3 (Step S816). The inter-firmware communicating unit 24 notifies the setting information to the inter-firmware communicating unit 7 of the first LIU 3 (Step S817).

The inter-firmware communicating unit 7 then receives the setting information from the inter-firmware communicating unit 24, and transfers the received setting information to the setting-control receiving unit 11 (Step S818). The setting-control receiving unit 11 receives the setting information (Step S819), and stores the received setting information (Step S820).

In this way, the firmware 21 installed in the CPU of the second LIU 20 stores information that the first port of the second LIU 20 is registered as an exclusive port of the BLSR. The firmware 4 installed in the CPU of the first LIU 3 stores the information that the first port of the second LIU 20 is registered as an exclusive port of the BLSR, by inter-firmware communication.

The setting-control receiving unit 28 then receives and stores the information that the first port of the second LIU 20 is registered as an exclusive port of the BLSR, and transmits the setting information to the CPU master/slave determining unit 25 (Step S821). The CPU master/slave determining unit 25 receives the information that the first port of the second LIU 20 is registered as an exclusive port of the BLSR (Step S822), determines based on the received information a master/slave relationship (whether a CPU is a master CPU or a slave CPU) of the CPU that accommodates the firmware 21 in the first port (Step S823), and updates setting information stored in the master/slave management storage unit 80.

That is, as illustrated in FIG. 5B, the CPU master/slave determining unit 25 determines that the CPU that accommodates the firmware 21 is a slave CPU in the first port, and updates the setting information stored in the master/slave management storage unit 250 to "S" indicating that the CPU is a slave CPU in the first port.

At the same time, the setting-control receiving unit 11 having received and stored the information that the first port of the first LIU 3 is registered as an exclusive port of the BLSR (see Step S805) transmits the setting information to the CPU master/slave determining unit 8 (Step S824). The CPU master/slave determining unit 8 receives the information that the first port of the first LIU 3 is registered as an exclusive port of the BLSR (Step S825), and determines based on the received information a master/slave relationship (whether a CPU is a master CPU or a slave CPU) of the CPU that accommodates the firmware 21 in the first port (Step S826), and updates setting information stored in the master/slave management storage unit 250.

That is, as illustrated in FIG. 5A, the CPU master/slave determining unit 8 determines that the CPU that accommodates the firmware 4 is a master CPU in the first port, and updates the setting information stored in the master/slave management storage unit 80 to "M" indicating that the CPU is a master CPU in the first port.

Further, the CPU master/slave determining unit 8 transmits a determination result to the hardware master/slave switching unit 16 (Step S827). The hardware master/slave switching unit 16 receives the determination result, and performs switchover of the hardware 14 (Step S828).

That is, because the CPU that accommodates the firmware 4 is determined as a master CPU, the hardware master/slave switching unit 16 switches the hardware 14 that accommodates the hardware master/slave switching unit 16 itself to master hardware in the first port.

The CPU master/slave determining unit 8 determines that the CPU that accommodates the firmware 4 is a master CPU in the first port, and instructs the inter-firmware communicating unit 7 to perform a switchover notification of a master/slave relationship to the second LIU 20 (Step S829). The inter-firmware communicating unit 7 transmits a switchover notification to the inter-firmware communicating unit 24 (Step S830). The inter-firmware communicating unit 24 of the second LIU 20 receives the switchover notification, and transfers the notification to the CPU master/slave determining unit 25 (Step S831). The CPU master/slave determining unit 25 transfers the switchover notification to a hardware master/slave switching unit 33 (Step S832).

The hardware master/slave switching unit 33 receives the switchover notification from the CPU master/slave determining unit 25, and performs switchover of the hardware 31 (Step S833). That is, the hardware master/slave switching unit 33 switches the hardware 31 that accommodates the hardware master/slave switching unit 33 itself to slave hardware in the first port.

A process identical to that of Step S801 to Step S833 described above is performed on the second port to the fourth port so as to set validity of the BLSR.

Further, as illustrated in FIGS. 9A to 9C, when a maintenance staff of the optical transmission device 100 according to the first embodiment inputs to the CPU 1 to set the BLSR valid in the fifth port of the first LIU 3 (Step S901), the user I/F unit 2 receives setting information, and transfers the received information to the first LIU 3 (Step S902). The first I/F unit 5 of the first LIU 3 transfers the setting information to the setting-control receiving unit 11 (Step S903).

The setting-control receiving unit 11 then receives the setting information (Step S904), stores the received setting information (Step S905), and instructs the inter-firmware communicating unit 7 to notify the received setting to the second LIU 20 (Step S906). The inter-firmware communicating unit 7 notifies the setting information to the inter-firmware communicating unit 24 (Step S907).

The inter-firmware communicating unit 24 of the second LIU 20 receives the setting information from the inter-firmware communicating unit 7, and transfers the setting information to the setting-control receiving unit 28 (Step S908). The setting-control receiving unit 28 receives the setting information (Step S909), and stores the received setting information (Step S910).

Accordingly, the firmware 4 installed in the CPU of the first LIU 3 stores information that the fifth port of the first LIU 3 is registered as an exclusive port of the BLSR. The firmware 21 installed in the CPU of the second LIU 20 receives and stores the information that the fifth port of the first LIU 3 is registered as an exclusive port of the BLSR, by inter-firmware communication.

When a maintenance staff of the optical transmission device 100 according to the first embodiment inputs to the CPU 1 to set the BLSR valid in the fifth port of the second LIU 20 (Step S911), the user I/F unit 2 receives setting information, and transfers the received information to the second LIU 20 (Step S912). The second I/F unit 22 of the second LIU 20 transfers the setting information to the setting-control receiving unit 28 (Step S913).

The setting-control receiving unit 28 receives the setting information (Step S914), stores the received setting information (Step S915), and instructs the inter-firmware communicating unit 24 to notify the received setting to the first LIU 3 (Step S916). The inter-firmware communicating unit 24 notifies the setting information to the inter-firmware communicating unit 7 (Step S917).

Next, the inter-firmware communicating unit 7 of the first LIU 3 receives the setting information from the inter-firmware communicating unit 24, and transfers the setting information to the setting-control receiving unit 11 (Step S918). The setting-control receiving unit 11 receives the setting information (Step S919), and stores the received setting information (Step S920).

In this manner, the firmware installed in the CPU of the second LIU 20 stores information that the fifth port of the second LIU 20 is registered as an exclusive port of the BLSR. The firmware installed in the CPU of the first LIU 3 stores information that the fifth port of the second LIU 20 is registered as an exclusive port of the BLSR, by inter-firmware communication.

The setting-control receiving unit 11 receives and stores information that the fifth port of the first LIU 3 is registered as an exclusive port of the BLSR, and transmits the setting information to the CPU master/slave determining unit 8 (Step S921). The CPU master/slave determining unit 8 receives the information that the fifth port of the first LIU 3 is registered as an exclusive port of the BLSR (Step S922), and determines based on the received information a master/slave relationship (whether a CPU is a master CPU or a slave CPU) of the CPU that accommodates the firmware 4 in the first port (Step S923), and updates setting information stored in the master/slave management storage unit 80.

That is, as illustrated in FIG. 5A, the CPU master/slave determining unit 8 determines that the CPU that accommodates the firmware 4 is a slave CPU in the fifth port, and updates the setting information stored in the master/slave management storage unit 80 to "S", which indicates that the CPU is a slave CPU in the fifth port.

At the same time, the setting-control receiving unit 28 that receives and stores the information that the fifth port of the second LIU 20 is registered as an exclusive port of the BLSR transmits the setting information to the CPU master/slave determining unit 25 (Step S924). The CPU master/slave determining unit 25 receives the information that the fifth port of the second LIU 20 is registered as an exclusive port of the BLSR (Step S925), and determines based on the received information a master/slave relationship (whether a CPU is a master CPU or a slave CPU) of the CPU that accommodates the firmware 21 in the first port (Step S926), and updates setting information stored in the master/slave management storage unit 250.

That is, as illustrated in FIG. 5B, the CPU master/slave determining unit 25 determines that the CPU that accommodates the firmware 21 is a master CPU in the fifth port, and updates the setting information stored in the master/slave management storage unit 250 to "M" indicating that the CPU is a master CPU in the fifth port.

Further, the CPU master/slave determining unit 25 transmits a determination result to the hardware master/slave switching unit 33 (Step S927). The hardware master/slave switching unit 33 receives the determination result, and performs switchover of the hardware 31 (Step S928).

That is, because the CPU that accommodates the firmware 21 is determined as a master CPU, the hardware master/slave switching unit 33 switches the hardware 31 that accommodates the hardware master/slave switching unit 33 itself to master hardware in the fifth port.

The CPU master/slave determining unit 25 determines that the CPU that accommodates the firmware 21 is a master CPU in the fifth port, and instructs the inter-firmware communicating unit 24 to perform a switchover notification of a master/slave relationship to the first LIU 3 (Step S929). The inter-firmware communicating unit 24 transmits a switchover notification to the inter-firmware communicating unit 7 (Step S930). The inter-firmware communicating unit 7 receives the switchover notification, and transfers the notification to the CPU master/slave determining unit 8 (Step S931). The CPU master/slave determining unit 8 transfers the switchover notification to the hardware master/slave switching unit 16 (Step S932).

The hardware master/slave switching unit 16 receives the switchover notification from the CPU master/slave determining unit 8, and performs switchover of the hardware 14 (Step S933). That is, the hardware master/slave switching unit 16 switches the hardware 14 that accommodates the hardware master/slave switching unit 16 itself to slave hardware in the fifth port.

A process identical to that of Step S901 to Step S933 described above is performed on the sixth port to the eighth port so as to set validity of the BLSR.

As described above, a validity setting of the BLSR in all ports and a setting of distributing the CPUs that perform switchover control in ports to the first LIU 3 and the second LIU 20 are completed at Step S801 to Step S833 illustrated in FIGS. 8A to 8C and at Step S901 to Step S933 illustrated in FIGS. 9A to 9C are completed, and an operation of the optical transmission device can be started.

Dynamic Switchover Process (First Embodiment)

A dynamic switchover process of the optical transmission device according to the first embodiment is explained next with reference to FIGS. 10A and 10B. As illustrated in FIGS. 10A and 10B, it is already set in the master/slave management storage unit 80 that the first LIU 3 functions as a master CPU in the first port to the fourth port, and it is already set in the master/slave management storage unit 250 that the second LIU 20 functions as a master CPU in the fifth port to the eighth port, as an operation state at the present time.

The CPU-load measuring unit 50 of the first LIU 3 measures a load factor of the CPU that accommodates the firmware 4, via a control program of the OS and the like (Step S1001), and determines a CPU load rank corresponding to the measured CPU load factor based on the CPU-load management table 40 (Step S1002).

When a dynamic switchover flag of the CPU-load management table is valid, the CPU-load measuring unit 50 issues a CPU-load-rank acquisition request to the inter-firmware communicating unit 7 to request the CPU-load measuring unit 70 of the second LIU 20 to acquire a CPU load rank (Step S1003).

The inter-firmware communicating unit 7 receives a notification of the CPU-load-rank acquisition request from the CPU-load measuring unit 50 (Step S1004), and issues the CPU-load-rank acquisition request to the second LIU 20 (Step S1005).

At the same time as when the CPU-load measuring unit 50 measures a load factor of the CPU, the CPU-load measuring unit 70 of the second LIU 20 measures a load factor of the CPU that stores the firmware 21 (Step S1006), and determines a CPU load rank corresponding to the measured CPU load factor based on a CPU-load management table 60 (Step S1007).

The inter-firmware communicating unit 24 receives the CPU-load-rank acquisition request from the first LIU 3 (Step S1008), and notifies the CPU-load-rank acquisition request to the CPU-load measuring unit 70 (Step S1009).

The CPU-load measuring unit 70 receives a CPU-load-rank acquisition-request response from the inter-firmware communicating unit 24 (Step S1010), and responds with a CPU load rank as a CPU-load-rank acquisition-request response (Step S1011).

The inter-firmware communicating unit 24 receives the CPU load rank as the CPU-load-rank acquisition-request response from the CPU-load measuring unit 70 (Step S1012), and issues the CPU load rank to the inter-firmware communicating unit 7 of the first LIU 3 (Step S1013).

The inter-firmware communicating unit 7 receives the CPU load rank from the second LIU 20 (Step S1014), and notifies the CPU load rank to the CPU-load measuring unit 50 (Step S1015).

The CPU-load measuring unit 50 receives the CPU load rank from the inter-firmware communicating unit 7 (Step S1016), compares a self-CPU load rank with a CPU load rank of the second LIU 20 (Step S1017), and obtains a comparison result. The CPU-load measuring unit 50 notifies to the CPU master/slave determining unit 8 a size relationship of the received CPU load ranks (such as the self-CPU load rank "3">the CPU load rank "2" of the second LIU 20), and a difference between the CPU load ranks ("3"−"2"="1") as a result of comparison (Step S1018).

The CPU master/slave determining unit 8 receives a comparison result of the self-CPU load rank and the CPU load rank of the second LIU 20 from the CPU-load measuring unit 50 (Step S1019), and performs dynamic switchover control of switchover to a master CPU or a slave CPU based on the comparison result (Step S1020).

Specifically, when a size relationship of the CPU load ranks received as the comparison result is that the self-CPU load rank "3">the CPU load rank "2" of the second LIU 20 and a difference between the CPU load ranks is "3"−"2"="1", for example, the CPU master/slave determining unit 8 performs a determination of changing the self CPU to a slave CPU in one of the first port to the fourth port in which the self CPU is set as a master CPU in the master/slave management storage unit 80.

When the CPU master/slave determining unit 8 determines to set the self CPU as a slave CPU in the fourth port, for example, the CPU master/slave determining unit 8 changes the setting information stored in the master/slave management storage unit 80 to "S" indicating that the CPU functions as a slave CPU in the fourth port, and notifies a determination result to the hardware master/slave switching unit 16 to change the setting of the fourth port to function as slave hardware.

Next, the CPU master/slave determining unit 8 notifies the inter-firmware communicating unit 7 to issue a switchover request to the CPU master/slave determining unit 25 of the second LIU 20 to set the CPU function as a master CPU in the fourth port (Step S1021).

The inter-firmware communicating unit 7 receives the issue notification of the switchover request from the CPU master/slave determining unit 8 (Step S1022), and issues the switchover request to the second LIU 20 to set the CPU function as a master CPU in the fourth port (Step S1023).

The inter-firmware communicating unit 24 of the second LIU 20 receives the switchover request from the first LIU (Step S1024), and notifies to the CPU master/slave determining unit 25 a reception of the switchover request in the fourth port (Step S1025).

The CPU master/slave determining unit 25 receives a notification of the reception of the switchover request from the inter-firmware communicating unit 24 (Step S1026), and performs dynamic switchover to set the CPU to function as a master CPU in the fourth port in an identical process to that of the CPU master/slave determining unit 8 (Step S1027; see FIG. 7B).

Effects of the First Embodiment

As described above, according to the first embodiment, by measuring a load factor of the CPU of each LIU having a redundant configuration, a CPU having a lower CPU load factor can be dynamically changed in many cases to a master CPU that independently performs switchover control in a predetermined port. Therefore, it is possible to prevent a main-signal failure time from becoming long.

According to the first embodiment, because a measured CPU load factor is replaced by a CPU load rank, measured CPU load factors can be easily compared with each other.

According to the first embodiment, because an LIU having a valid flag (for example, "ACT") to independently perform dynamic switchover independently compares between CPU load ranks, the CPU load ranks can be efficiently compared.

[b] Second Embodiment

Figure 11A:
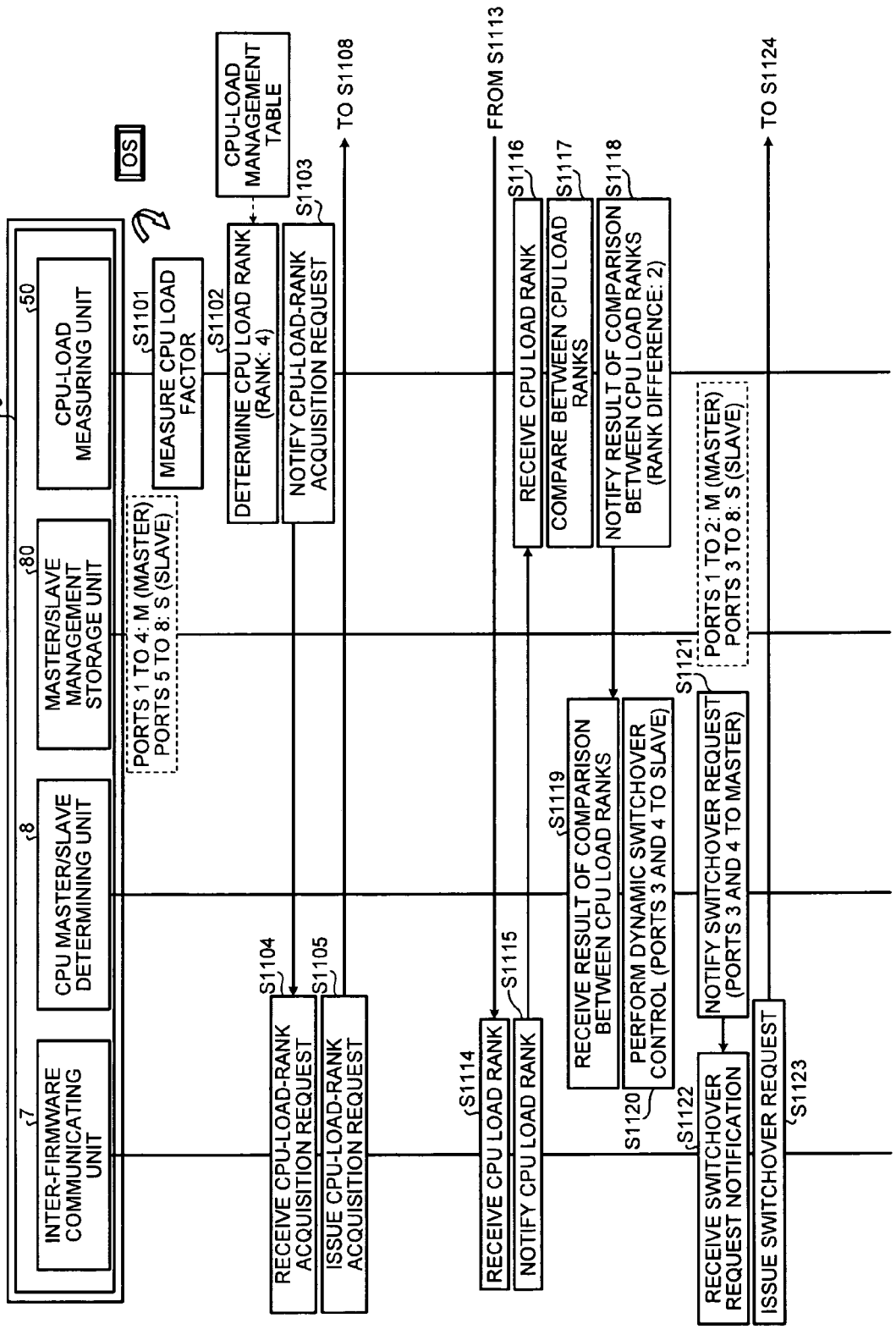
FIGS. 11A and 11B are sequence diagrams of a dynamic switchover process flow of an optical transmission device according to a second embodiment of the present invention.
Figure 11B:
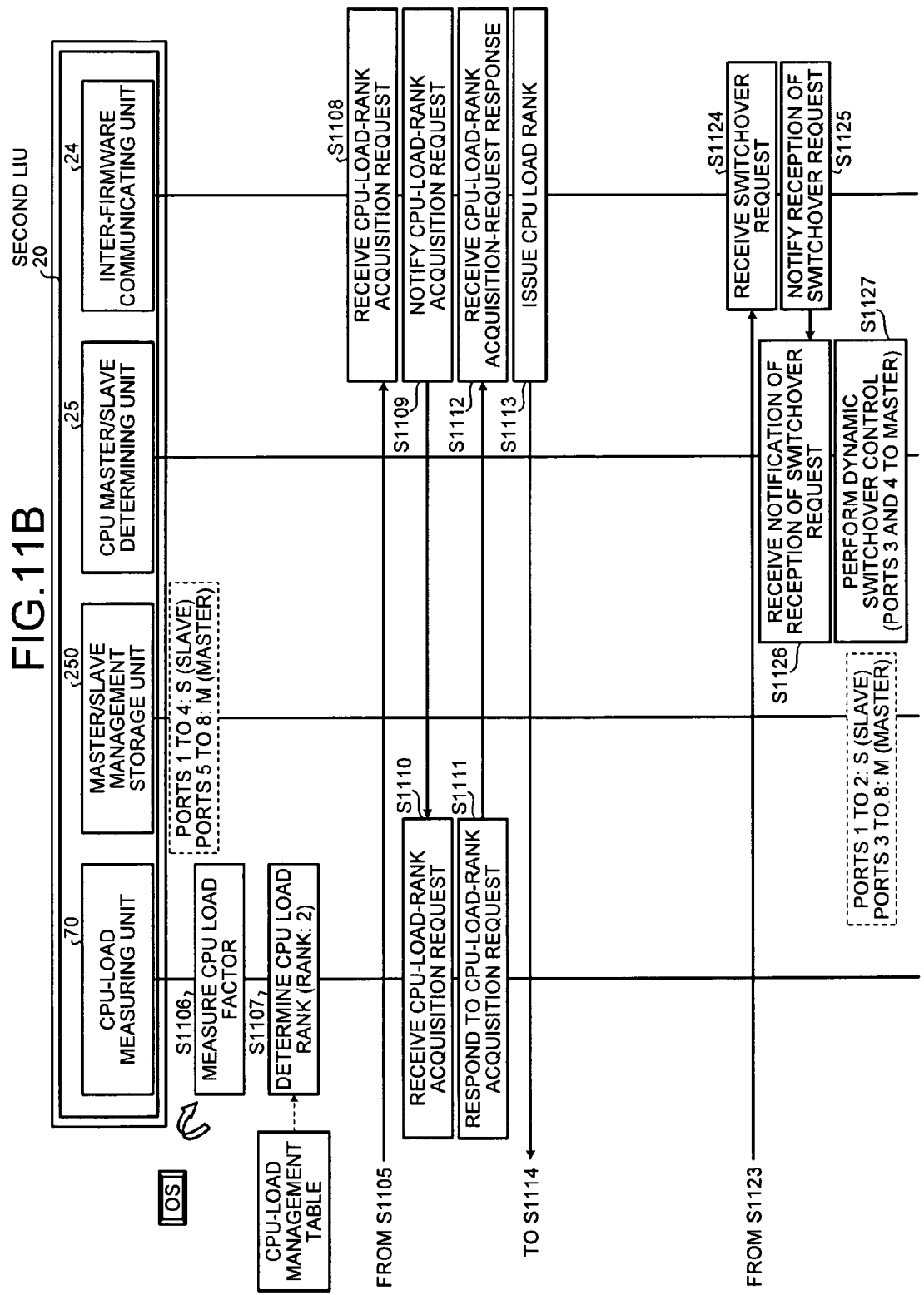

In the second embodiment, a dynamic switchover process when a CPU load rank of the first LIU is "3" and also when a CPU load rank of the second LIU is "2" is explained. In a second embodiment of the present invention, a dynamic switchover process when a CPU load rank of the first LIU is "4" and also when a CPU load rank of the second LIU is "2" is explained with reference to FIGS. 11A, 11B, 12A, and 12B. FIGS. 11A and 11B are sequence diagrams of a dynamic switchover process flow of an optical transmission device according to the second embodiment. FIGS. 12A and 12B are schematic diagrams for explaining a master/slave management storage unit according to the second embodiment.

In the dynamic switchover process of the optical transmission device according to the second embodiment, processes at Step S1101 to Step S1117 illustrated in FIG. 11 are identical to those at Step S1001 to Step S1017 illustrated in FIGS. 10A and 10B explained in the first embodiment. Therefore, processes at and after Step S1118 are explained below.

As illustrated in FIGS. 11A and 11B, the CPU-load measuring unit 50 of the first LIU 3 compares a self-CPU load rank with a CPU load rank of the second LIU 20 (Step S1117), and obtains a comparison result. The CPU-load measuring unit 50 notifies to the CPU master/slave determining unit 8 information of a size relationship of the received CPU load ranks (such as the self-CPU load rank "4">the CPU load rank "2" of the second LIU 20), and a difference between the CPU load ranks ("4"–"2"="2") as a result of comparison (Step S1118).

The CPU master/slave determining unit 8 receives a comparison result of the self-CPU load rank and the CPU load rank of the second LIU 20 from the CPU-load measuring unit 50 (Step S1119), and performs dynamic switchover control of switchover to a master CPU or a slave CPU based on the comparison result (Step S1120).

Specifically, when a size relationship of the CPU load ranks received as the comparison result is that the self-CPU load rank "4">the CPU load rank "2" of the second LIU 20 and a difference between the CPU load ranks is "4"–"2"="2", for example, the CPU master/slave determining unit 8 performs a determination of changing the self CPU to a slave CPU in two of the first port to the fourth port in which the self CPU is set as a master CPU in the master/slave management storage unit 80.

When the CPU master/slave determining unit 8 determines to set the self CPU as a slave CPU in the third port and the fourth port, for example, the CPU master/slave determining unit 8 changes the setting information stored in the master/slave management storage unit 80 to "S" indicating that the CPU functions as a slave CPU in the third port and the fourth port, and notifies a determination result to the hardware master/slave switching unit 16 to change the setting of the third port and the fourth port to function as slave hardware.

The CPU master/slave determining unit 8 notifies the inter-firmware communicating unit 7 to issue a switchover request to the CPU master/slave determining unit 25 of the second LIU 20 to set the CPU function as a master CPU in the third port and the fourth port (Step S1121).

The inter-firmware communicating unit 7 receives the issue notification of the switchover request from the CPU master/slave determining unit 8 (Step S1122), and issues the switchover request to the second LIU 20 to set the CPU function as a master CPU in the third port and the fourth port (Step S1123).

The inter-firmware communicating unit 24 of the second LIU 20 receives the switchover request from the first LIU (Step S1124), and notifies to the CPU master/slave determining unit 25 a reception of the switchover request in the third port and the fourth port (Step S1025).

The CPU master/slave determining unit 25 receives a notification of the reception of the switchover request from the inter-firmware communicating unit 24 (Step S1126), and performs dynamic switchover to set the CPU to function as a master CPU in the third port and the fourth port in an identical process to that of the CPU master/slave determining unit 8 (Step S1127; see FIG. 12B).

Effects of the Second Embodiment

According to the second embodiment, it is possible to dynamically change the number of setting a master CPU in each LIU in which a CPU functions as a master CPU in predetermined ports according to a difference between CPU load ranks of the LIUs.

[c] Third Embodiment

In a third embodiment of the present invention, a dynamic switchover process when a CPU load rank of the first LIU is "2" and also when a CPU load rank of the second LIU is "5" is explained with reference to FIGS. 13 and 14. FIGS. 13A and 13B are sequence diagrams of a flow of a dynamic switchover process of an optical transmission device according to the third embodiment. FIGS. 14A and 14B are schematic diagrams for explaining a master/slave management storage unit according to the third embodiment.

Figure 13A:
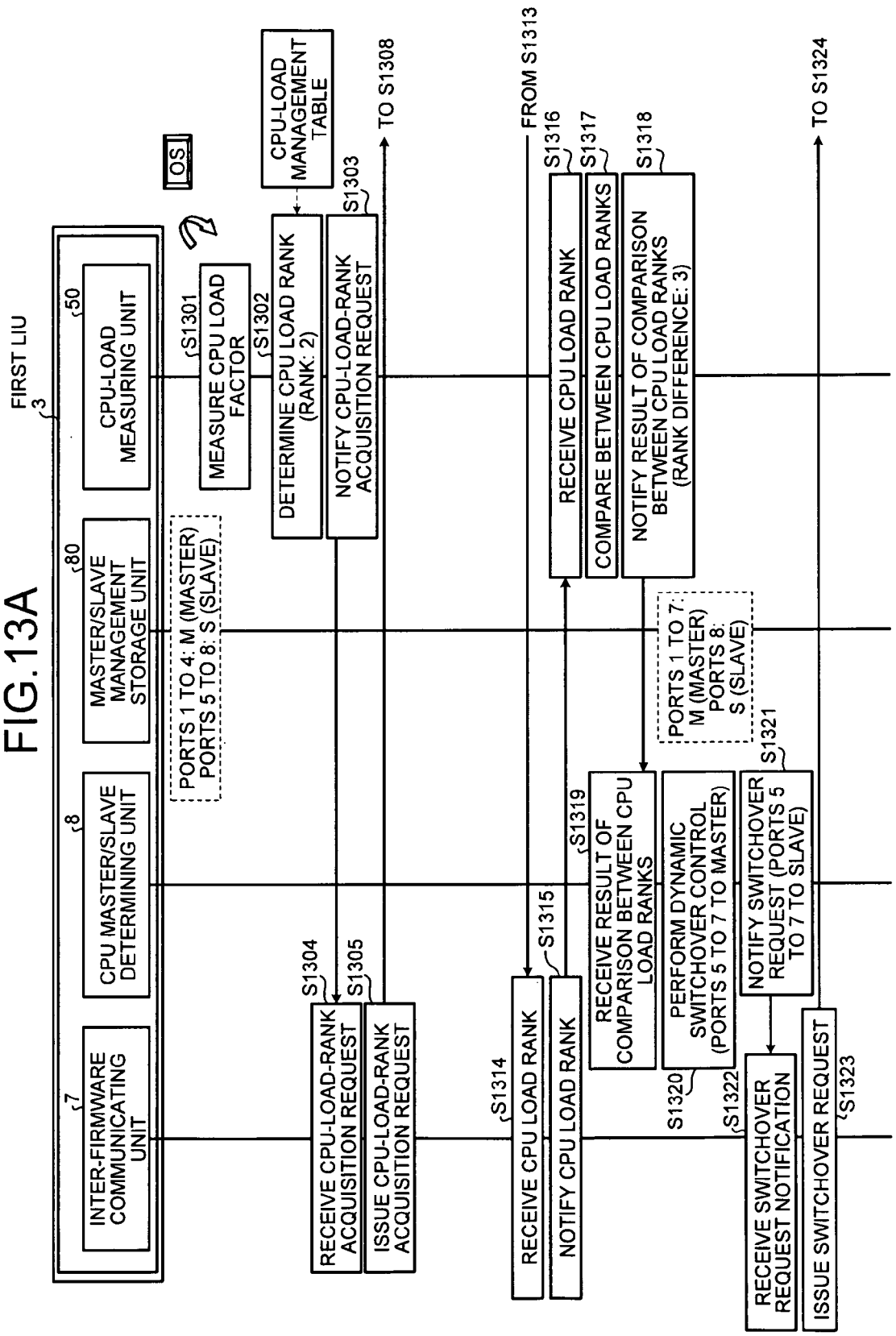
FIGS. 13A and 13B are sequence diagrams of a flow of a dynamic switchover process of an optical transmission device according to a third embodiment of the present invention.
Figure 13B:
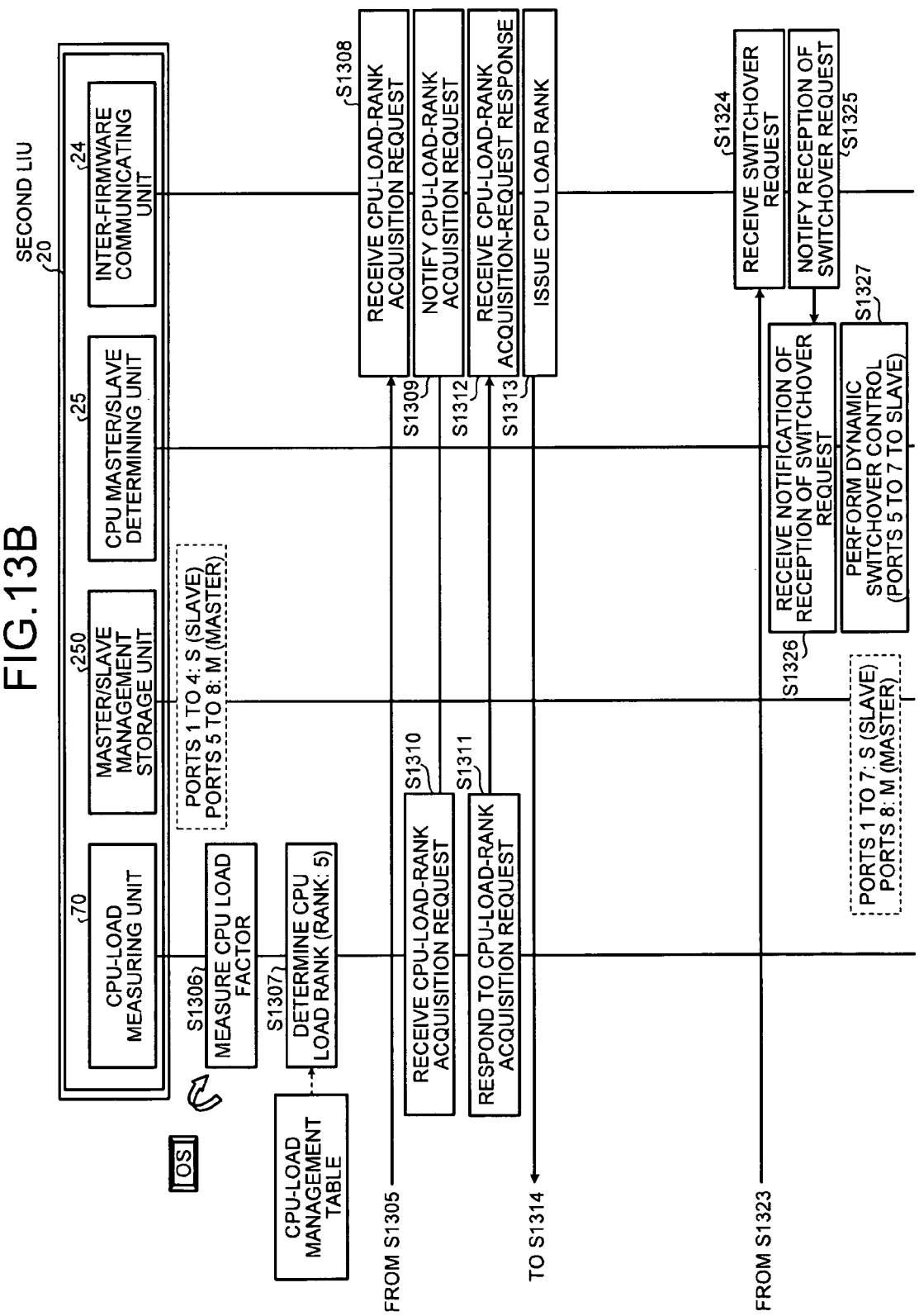

In the dynamic switchover process of the optical transmission device according to the third embodiment, processes at Step S1301 to Step S1317 illustrated in FIGS. 13A and 13B are identical to those at Step S1001 to Step S1017 illustrated in FIGS. 10A and 10B explained in the first embodiment and those at Step S1101 to Step S1117 illustrated in FIGS. 11A and 11B explained in the second embodiment. Therefore, processes at and after Step S1318 are explained below.

As illustrated in FIGS. 13A and 13B, the CPU-load measuring unit 50 of the first LIU 3 compares a self-CPU load rank with a CPU load rank of the second LIU 20 (Step S1317), and obtains a comparison result. The CPU-load measuring unit 50 notifies to the CPU master/slave determining unit 8 information of a size relationship of the received CPU load ranks (such as the self-CPU load rank "2"<the CPU load rank "5" of the second LIU 20), and a difference between the CPU load ranks ("5"–"2"="3") as a result of comparison (Step S1318).

The CPU master/slave determining unit 8 receives a comparison result of the self-CPU load rank and the CPU load rank of the second LIU 20 from the CPU-load measuring unit 50 (Step S1319), and performs dynamic switchover control of switchover to a master CPU or a slave CPU based on the comparison result (Step S1320).

Specifically, when a size relationship of the CPU load ranks received as the comparison result is that the self-CPU load rank "2"<the CPU load rank "5" of the second LIU 20 and a difference between the CPU load ranks is "5"–"2"="3", for example, the CPU master/slave determining unit 8 performs a determination of changing the self CPU to a master CPU in three of the fifth port to the eighth port in which the self CPU is set as a slave CPU in the master/slave management storage unit 80.

When the CPU master/slave determining unit 8 determines to set the self CPU as a master CPU in the fifth port to the seventh port, for example, as illustrated in FIG. 14A, the CPU master/slave determining unit 8 changes the setting information stored in the master/slave management storage unit 80 to "M" indicating that the CPU functions as a master CPU in the fifth port to the seventh port, and notifies a determination result to the hardware master/slave switching unit 16 to change the setting of the fifth port to the seventh port to function as master hardware.

Subsequently, the CPU master/slave determining unit 8 notifies the inter-firmware communicating unit 7 to issue a switchover request to the second LIU 20 to set the CPU to function as a slave CPU in the fifth port to the seventh port (Step S1321).

The inter-firmware communicating unit 7 receives the issue notification of the switchover request from the CPU master/slave determining unit 8 (Step S1322), and issues the switchover request to the CPU master/slave determining unit 25 of the second LIU 20 to set the CPU function as a slave CPU in the fifth port to the seventh 1 port (Step S1323).

The inter-firmware communicating unit 24 of the second LIU 20 receives the switchover request from the first LIU (Step S1324), and notifies to the CPU master/slave determining unit 25 a reception of the switchover request in the fifth port to the seventh port (Step S1325).

The CPU master/slave determining unit 25 receives a notification of the reception of the switchover request from the inter-firmware communicating unit 24 (Step S1326), and performs dynamic switchover to set the CPU to function as a slave CPU in the fifth port to the seventh port in an identical process to that of the CPU master/slave determining unit 8 (Step S1327; see FIG. 14B).

Effects of Third Embodiment

As described above, according to the third embodiment, it is possible to dynamically change the number of setting a master CPU in each LIU in which a CPU functions as a master CPU in predetermined ports according to a difference between CPU load ranks of the LIUs.

[d] Fourth Embodiment

While the first to third embodiments of the present invention have been explained above, the invention can be carried out by various embodiments other than the above embodiments. Another embodiment included in the present invention is explained below.

(1) Case when Dynamic Switchover Process is not Performed

In the first to third embodiments described above, examples of dynamically changing the number of setting a master CPU in each LIU according to a difference between CPU load ranks of the LIUs have been explained. However, the present invention is not limited to these examples. When there is no difference between CPU load ranks of the LIUs, a dynamic switchover process does not need to be performed. This case is briefly explained below with reference to FIG. 15. FIG. 15 is a configuration example of a CPU-load management table according to a fourth embodiment of the present invention.

For example, as illustrated in FIG. 15, a maintenance staff of the optical transmission device 100 sets in advance a CPU load rank "1" when a CPU load factor is "0% to 50%". When a CPU load factor of the first LIU 3 is 20% and also when a CPU load factor of the second LIU 20 is 50%, CPU load ranks of the first LIU 3 and the second LIU 20 are "1", and there is no difference between the CPU load ranks. Therefore, a CPU master/slave determining unit in which a dynamic switchover flag is set valid in the CPU-load management table does not perform a dynamic switchover process.

With this arrangement, the user can properly set the CPU load factor at the time of performing a dynamic switchover process of a master CPU to avoid the master CPU from performing unnecessary dynamic switchover.

(2) Process Using CPU Load Factor

In the above embodiments, CPU load ranks determined according to the CPU load factors of the LIUs are compared based on the CPU load ranks set in advance according to the CPU load factors of the LIUs, and a dynamic switchover process of the master CPU is performed based on a result of comparison. However, the present invention is not limited thereto. The CPU load factors of the LIUs can be directly compared with each other, and a master CPU can be dynamically switched based on a result of comparison between the CPU load factors.

(3) Device Configuration or the Like

Respective constituent elements of the optical transmission device 100 illustrated in FIG. 4 are functionally conceptual, and physically the same configuration as illustrated in the drawing is not always necessary. That is, the specific mode of distribution and integration of the optical transmission device 100 is not limited to the illustrated one, and all or a part thereof can be functionally or physically distributed or integrated in an arbitrary unit, according to various kinds of load and the status of use. Furthermore, all or an arbitrary part of respective processing functions (see drawings such as FIGS. 10, 11, and 13) performed by the optical transmission device 100 can be realized by a CPU and a program analyzed and executed in the CPU, or realized as hardware by a wired logic.

(4) Switchover Processing Program

Figure 16:
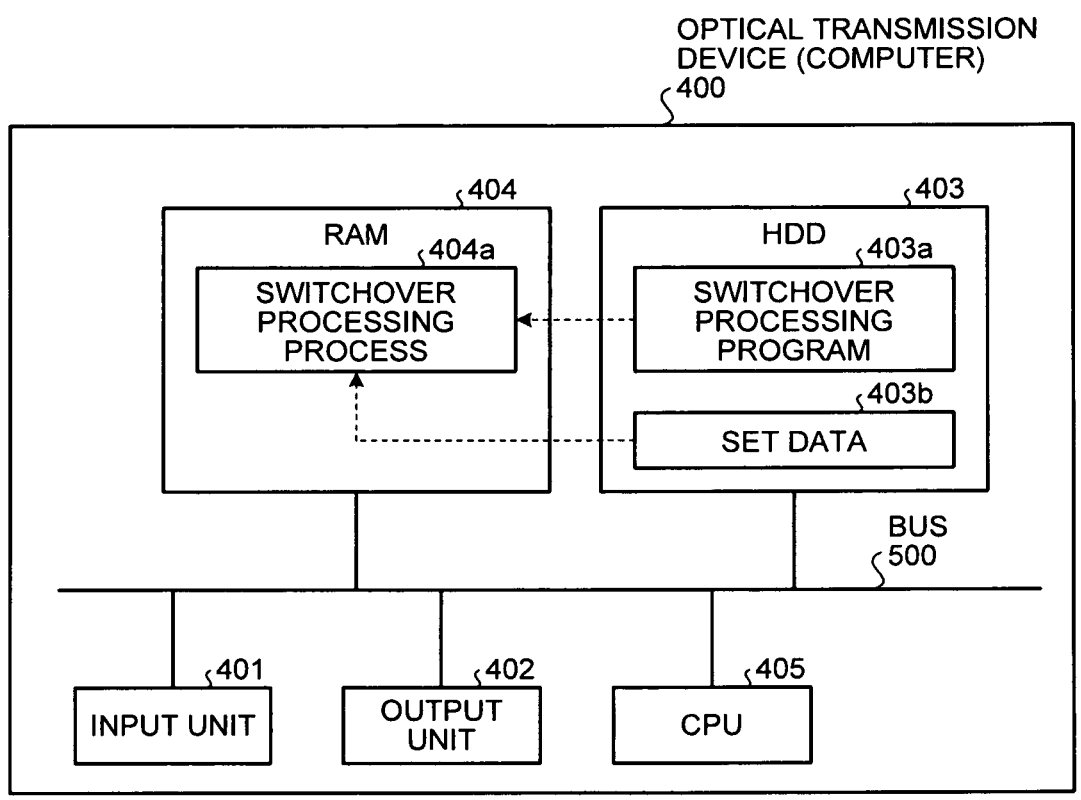
FIG. 16 depicts a computer that executes a switchover processing program.
Figure 17A:
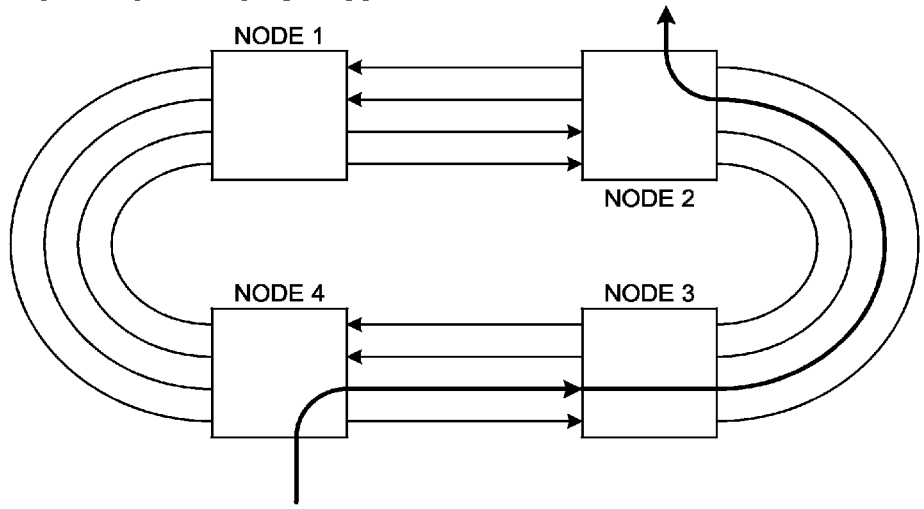
FIGS. 17A and 17B are schematic diagrams for explaining a switchover process of switching to a redundant system in a network configuration of a BLSR.
Figure 17B:
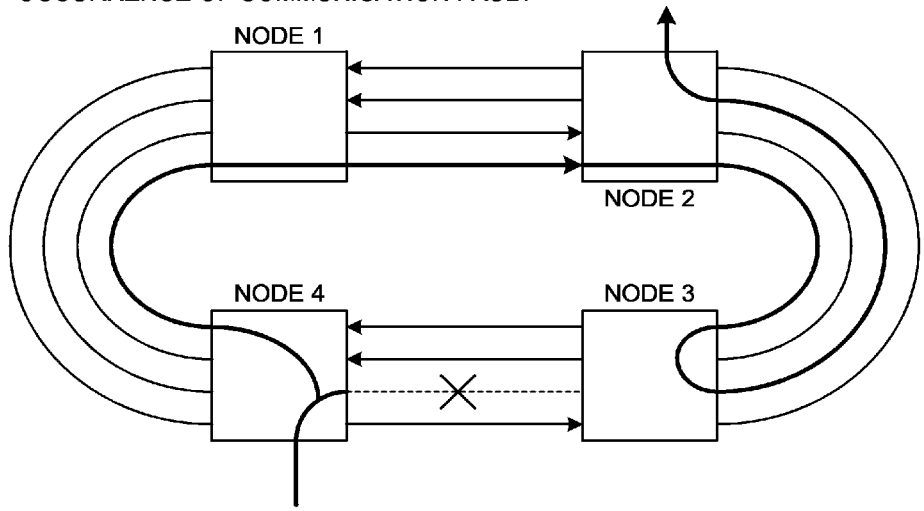
Figure 18:
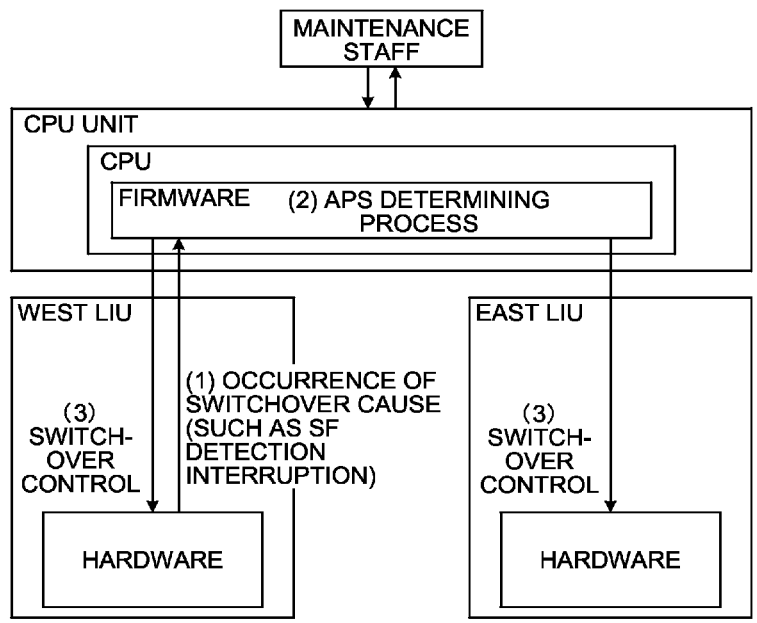
FIG. 18 is a schematic diagram for explaining a configuration of a centralized CPU device.
Figure 19:
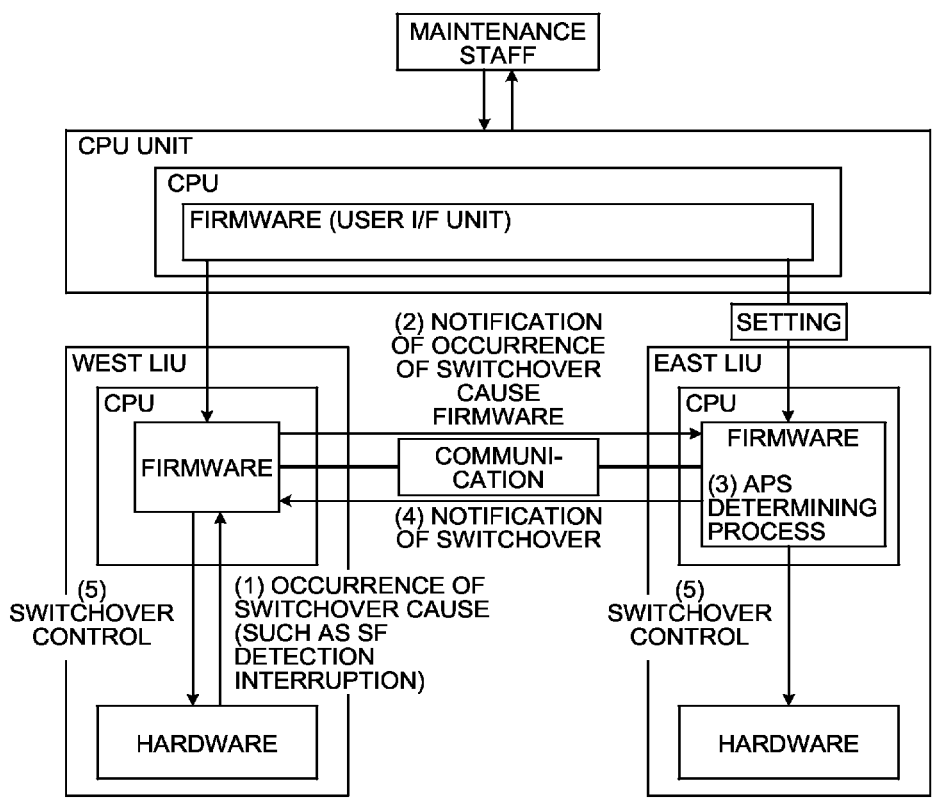
FIG. 19 is a schematic diagram for explaining a configuration of a distributed CPU device.
Figure 20A:
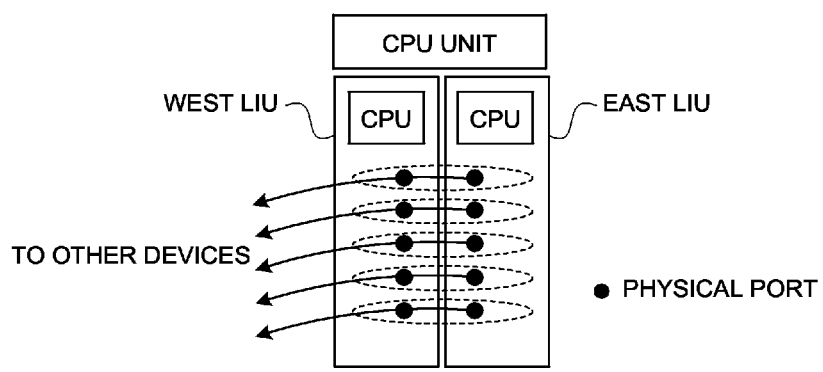
FIGS. 20A and 20B are schematic diagrams for explaining problems of a conventional technique.
Figure 20B:
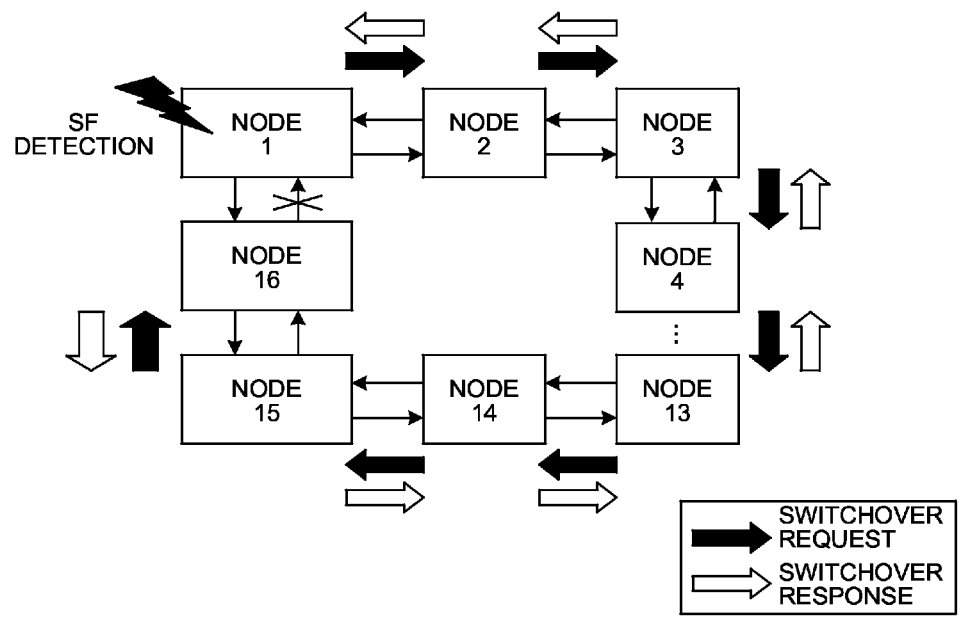

Various processes (see the drawings such as FIGS. 10, 11, and 13) of the optical transmission device 100 according to the above embodiments can be achieved by executing a program prepared in advance by a personal computer or a computer system such as a workstation. An example of a computer executing a switchover processing program having identical functions to those of the above embodiments is explained below with reference to FIG. 16. FIG. 16 depicts a computer that executes a switchover processing program.

As illustrated in FIG. 16, a computer 400 as an optical transmission device is configured by having an input unit 401, an output unit 402, a hard disc drive (HDD) 403, a random access memory (RAM) 404, and a CPU 405 connected to each other by a bus 500.

The input unit 401 receives input of various data from the user. The output unit 402 displays various kinds of information. The HDD 403 stores information necessary for the CPU 405 to perform various processes. The RAM 404 temporarily stores various kinds of information. The CPU 405 performs various processes.

As illustrated in FIG. 16, the HDD 403 stores in advance a switchover processing program 403a and set data 403b exerting functions identical to those of each processing unit of the optical transmission device 100 explained in the above embodiments. The switchover processing program 403a can be properly distributed, and can be stored in storage units of other computers communicably connected via a network.

The CPU 405 reads the switchover processing program 403a from the HDD 403, and develops in the RAM 404. As a result, the switchover processing program 403a can function as a switchover processing process 404a as illustrated in FIG. 16. The switchover processing process 404a reads the set data 403b and others from the HDD 403, and develops the read data into a region allocated to the process itself in the RAM 404, and performs various processes based on the developed data. The switchover processing process 404a corresponds to a process performed in the firmware 4 and the firmware 21 of the optical transmission device 100 illustrated in FIG. 4.

The switchover processing program 403a is not necessarily required to be stored in the HDD 403 from the beginning. For example, programs can be stored in "portable physical medium" such as a flexible disk (FD), a compact disk read only memory (CD-ROM), a digital versatile disk (DVD), an optical magnetic disk, and an integrated circuit (IC) card inserted in the computer 400. The programs can be also stored in "other computers or servers" connected to the computer 400 via a public line, the Internet, a local area network (LAN), and a wide area network (WAN). The computer 400 can read these programs and execute them.

According to the present invention, it is possible to prevent a master CPU from performing unnecessary dynamic switchover.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device in which hardware installed in each of a pair of line cards having a redundant configuration by accommodating plural ports acquires for each port each piece of fault information of a currently-used line and an auxiliary line having a redundant line, a CPU incorporated in each line card having the redundant configuration determines for each port switchover control of the redundant line based on the fault information acquired, and the hardware performs for each port switchover of the redundant line and transmits an optical signal of an SDH/SONET system by a ring network, based on a switchover control determination by the CPU, the transmission device comprising:
   a master/slave CPU-distribution setting unit that sets a CPU incorporated in each line card having the redundant configuration as a master CPU that determines switchover control of the redundant line in distribution for each port, and sets as a slave CPU of a predetermined port a CPU incorporated in a line card at the opposite side of the line card in which the CPU incorporated as the master CPU of the predetermined port is set;
   a CPU-load-status measuring unit that measures a load status of a CPU incorporated in each line card having the redundant configuration;
   a CPU-load-rank-information managing unit that manages CPU-load rank information having a CPU load rank set in advance to each hierarchy having a CPU load factor that indicates a load status of the CPU segmented in a predetermined numerical range, the CPU load rank having a higher numerical value when the CPU load factor is higher; and
   a master/slave CPU-setting changing unit that determines a CPU load rank according to a CPU load factor of a CPU incorporated in each line card having the redundant configuration based on the CPU-load rank information managed by the CPU-load rank-information managing unit, compares between the determined CPU load ranks, and changes a setting of a CPU such that a CPU of a low CPU load rank is set more as a master CPU when there is a difference between CPU load ranks.

2. The transmission device according to claim 1, further comprising a flag-information setting unit that sets flag information to any one of the line cards having the redundant configuration to cause the card to independently compare between CPU load ranks.

3. The transmission device according to claim 2, wherein in a line card in which the flag information is set by the flag-information setting unit, the master/slave CPU-setting changing unit compares between CPU load ranks of CPUs incorporated in the line cards having the redundant configuration, and changes a setting such that a CPU incorporated in the line card in which the flag information is set is set more as a master CPU according to number of a difference between the CPU load ranks when a CPU load rank of the CPU incorporated in the line card in which the flag information is set is lower than a CPU load rank of the CPU incorporated in the line card at the opposite side.

4. The transmission device according to claim 2, wherein in a line card in which the flag information is set by the flag-information setting unit, the master/slave CPU-setting changing unit compares between CPU load ranks of CPUs incorporated in the line cards having the redundant configuration, and changes a setting such that a CPU incorporated in the line card in which the flag information is set is set more as a slave CPU according to number of a difference between the CPU load ranks when a CPU load rank of the CPU incorporated in the line card in which the flag information is set is higher than a CPU load rank of the CPU incorporated in the line card at the opposite side.

5. The transmission device according to claim 2, wherein in a line card in which the flag information is set by the flag-information setting unit, the master/slave CPU-setting changing unit compares between CPU load ranks of CPUs incorporated in the line cards having the redundant configuration, and does not change a setting distribution of a master CPU when a CPU load rank of the CPU incorporated in the line card in which the flag information is set matches a CPU load rank of the CPU incorporated in the line card at the opposite side.

6. A switchover processing method in a transmission device transmitting an optical signal of an SDH/SONET system by a ring network in which hardware installed in each of a pair of line cards having a redundant configuration by accommodating plural ports acquires for each port each piece of fault information of a currently-used line and an auxiliary line constituting a redundant line, a CPU incorporated in each line card having the redundant configuration determines for each port switchover control of the redundant line based on the fault information acquired, and the hardware performs for each port switchover of the redundant line, the method comprising:
   setting a CPU incorporated in each line card having the redundant configuration as a master CPU determining switchover control of the redundant line in distribution for each port, and setting as a slave CPU of a predetermined port a CPU incorporated in line card at the opposite side of the line card in which the CPU incorporated as the master CPU of the predetermined port is set;
   measuring a load status of a CPU incorporated in each line card having the redundant configuration;
   managing CPU-load rank information having a CPU load rank set in advance to each hierarchy having a CPU load factor that indicates a load status of the CPU segmented in a predetermined numerical range, the CPU load rank having a higher numerical value when the CPU load factor is higher;
   determining a CPU load rank according to a CPU load factor of a CPU incorporated in each line card having the redundant configuration based on the CPU-load rank information managed at the managing; and
   changing a setting of a CPU such that a CPU of a low CPU load rank is set more as a master CPU when there is a difference between CPU load ranks, by comparing between the determined CPU load ranks.

7. The switchover processing method according to claim 6, further comprising setting flag information to any one of the line cards having the redundant configuration to cause the card to independently compare between CPU load ranks.

8. The switchover processing method according to claim 7, wherein in a line card in which the flag information is set at the setting, the changing includes
comparing between CPU load ranks of CPUs incorporated in the line cards having the redundant configuration; and
thus changing a setting such that a CPU incorporated in the line card in which the flag information is set is set more as a master CPU according to number of a difference between the CPU load ranks when a CPU load rank of the CPU incorporated in the line card in which the flag information is set is lower than a CPU load rank of the CPU incorporated in the line card at the opposite side.

9. The switchover processing method according to claim 7, wherein in a line card in which the flag information is set at the setting, the changing unit includes
comparing between CPU load ranks of CPUs incorporated in the line cards having the redundant configuration; and
thus changing a setting such that a CPU incorporated in the line card in which the flag information is set is set more as a slave CPU according to number of a difference between the CPU load ranks when a CPU load rank of the CPU incorporated in the line card in which the flag information is set is higher than a CPU load rank of the CPU incorporated in the line card at the opposite side.

10. The switchover processing method according to claim 7, wherein in a line card in which the flag information is set at the setting, the changing includes
comparing between CPU load ranks of CPUs incorporated in the line cards having the redundant configuration; and
thus not changing a setting distribution of a master CPU when a CPU load rank of the CPU incorporated in the line card in which the flag information is set matches a CPU load rank of the CPU incorporated in the line card at the opposite side.

11. A non-transitory computer readable storage medium having stored therein a switchover processing program for a switchover processing method in a transmission device transmitting an optical signal of an SDH/SONET system by a ring network in which hardware installed in each of a pair of line cards having a redundant configuration by accommodating plural ports acquires for each port each piece of fault information of a currently-used line and an auxiliary line constituting a redundant line, a CPU incorporated in each line card having the redundant configuration determines for each port switchover control of the redundant line based on the fault information acquired, and the hardware performs for each port switchover of the redundant line, the switchover processing program causing a computer to execute a process comprising:
setting a CPU incorporated in each line card having the redundant configuration as a master CPU determining switchover control of the redundant line in distribution for each port, and setting as a slave CPU of a predetermined port a CPU incorporated in line card at the opposite side of the line card in which the CPU incorporated as the master CPU of the predetermined port is set;
measuring a load status of a CPU incorporated in each line card having the redundant configuration; and
managing CPU-load rank information having a CPU load rank set in advance to each hierarchy having a CPU load factor that indicates a load status of the CPU segmented in a predetermined numerical range, the CPU load rank having a higher numerical value when the CPU load factor is higher;
determining a CPU load rank according to a CPU load factor of a CPU incorporated in each line card having the redundant configuration based on the CPU-load rank information managed at the managing; and
changing a setting of a CPU such that a CPU of a low CPU load rank is set more as a master CPU when there is a difference between CPU load ranks, by comparing between the determined CPU load ranks.

12. The non-transitory computer readable storage medium according to claim 11, wherein the process further comprising setting flag information to any one of the line cards having the redundant configuration to cause the card to independently compare between CPU load ranks.

13. The non-transitory computer readable storage medium according to claim 12, wherein in a line card in which the flag information is set at the setting, the changing includes
comparing between CPU load ranks of CPUs incorporated in the line cards having the redundant configuration; and
thus changing a setting such that a CPU incorporated in the line card in which the flag information is set is set more as a master CPU according to number of a difference between the CPU load ranks when a CPU load rank of the CPU incorporated in the line card in which the flag information is set is lower than a CPU load rank of the CPU incorporated in the line card at the opposite side.

14. The non-transitory computer readable storage medium according to claim 12, wherein in a line card in which the flag information is set at the setting, the changing unit includes
comparing between CPU load ranks of CPUs incorporated in the line cards having the redundant configuration; and
thus changing a setting such that a CPU incorporated in the line card in which the flag information is set is set more as a slave CPU according to number of a difference between the CPU load ranks when a CPU load rank of the CPU incorporated in the line card in which the flag information is set is higher than a CPU load rank of the CPU incorporated in the line card at the opposite side.

15. The non-transitory computer readable storage medium according to claim 12, wherein in a line card in which the flag information is set at the setting, the changing includes
comparing between CPU load ranks of CPUs incorporated in the line cards having the redundant configuration; and
thus not changing a setting distribution of a master CPU when a CPU load rank of the CPU incorporated in the line card in which the flag information is set matches a CPU load rank of the CPU incorporated in the line card at the opposite side.

* * * * *

UNITED STATES PATENT AND TRADEMARK OFFICE
CERTIFICATE OF CORRECTION

PATENT NO.        : 8,462,652 B2
APPLICATION NO.   : 12/662369
DATED             : June 11, 2013
INVENTOR(S)       : Yoshiyuki Maeda et al.

It is certified that error appears in the above-identified patent and that said Letters Patent is hereby corrected as shown below:

In the Claims:

In Col. 23, Line 51, In Claim 1, delete "CPU-load rank-information" and insert -- CPU-load-rank information --, therefor.

In Col. 23, Line 67, In Claim 3, after "is set" delete "is set". (Second Occurrence)

In Col. 24, Line 12 (Approx.), In Claim 4, after "is set" delete "is set". (Second Occurrence)

In Col. 25, Line 7 (Approx.), In Claim 8, after "is set" delete "is set". (Second Occurrence)

In Col. 25, Line 19, In Claim 9, after "is set" delete "is set". (Second Occurrence)

In Col. 26, Line 28, In Claim 13, after "is set" delete "is set". (Second Occurrence)

In Col. 26, Line 40, In Claim 14, after "is set" delete "is set". (Second Occurrence)

Signed and Sealed this
Eighth Day of October, 2013

Teresa Stanek Rea
*Deputy Director of the United States Patent and Trademark Office*